United States Patent
Kato

(10) Patent No.: US 6,683,880 B2
(45) Date of Patent: Jan. 27, 2004

(54) SWITCHING SYSTEM, A SUBSCRIBER APPARATUS AND A SWITCHING APPARATUS

(75) Inventor: Masaaki Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/151,092

(22) Filed: Sep. 10, 1998

(65) Prior Publication Data

US 2003/0043791 A1 Mar. 6, 2003

(30) Foreign Application Priority Data

Feb. 12, 1998 (JP) .......................................... 10-030206

(51) Int. Cl.$^7$ .............................................. H04L 12/28
(52) U.S. Cl. ...................... 370/399; 370/409; 370/522
(58) Field of Search ................................ 370/409, 397, 370/399, 395, 395.2, 395.65, 522, 463, 389, 392, 299

(56) References Cited

U.S. PATENT DOCUMENTS

| 4,734,931 A | 3/1988 | Bourg et al. | |
|---|---|---|---|
| 5,440,547 A | * 8/1995 | Easki et al. | 370/60 |
| 5,689,499 A | * 11/1997 | Hullett et al. | 370/235 |
| 5,850,395 A | * 12/1998 | Hauser et al. | 370/398 |
| 6,148,001 A | * 11/2000 | Soirinuo et al. | 370/420 |

FOREIGN PATENT DOCUMENTS

| DE | 36 26 870 | 6/1990 |
|---|---|---|
| JP | 9-247153 | 9/1997 |

\* cited by examiner

Primary Examiner—Alpus H. Hsu
Assistant Examiner—Thien D Tran
(74) Attorney, Agent, or Firm—Katten Muchin Zavis Rosenman

(57) ABSTRACT

In a technique relating to a switching system, at least a switching apparatus can acquire an information channel of a physical line different from a physical line to which a signaling channel, over which a setup request is transmitted, belongs as an information channel in response to the setup request, thereby backing up when a signaling channel becomes unusable, or distributing a load of virtual connection setting control using a plurality of signaling channels.

29 Claims, 22 Drawing Sheets

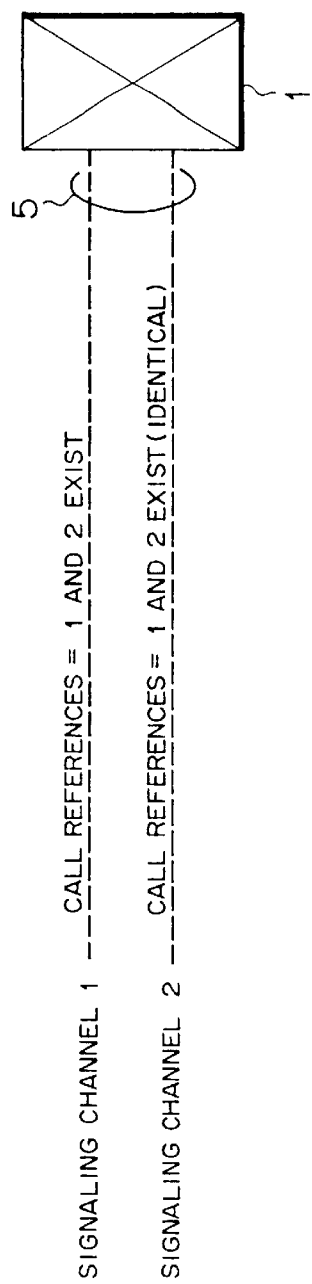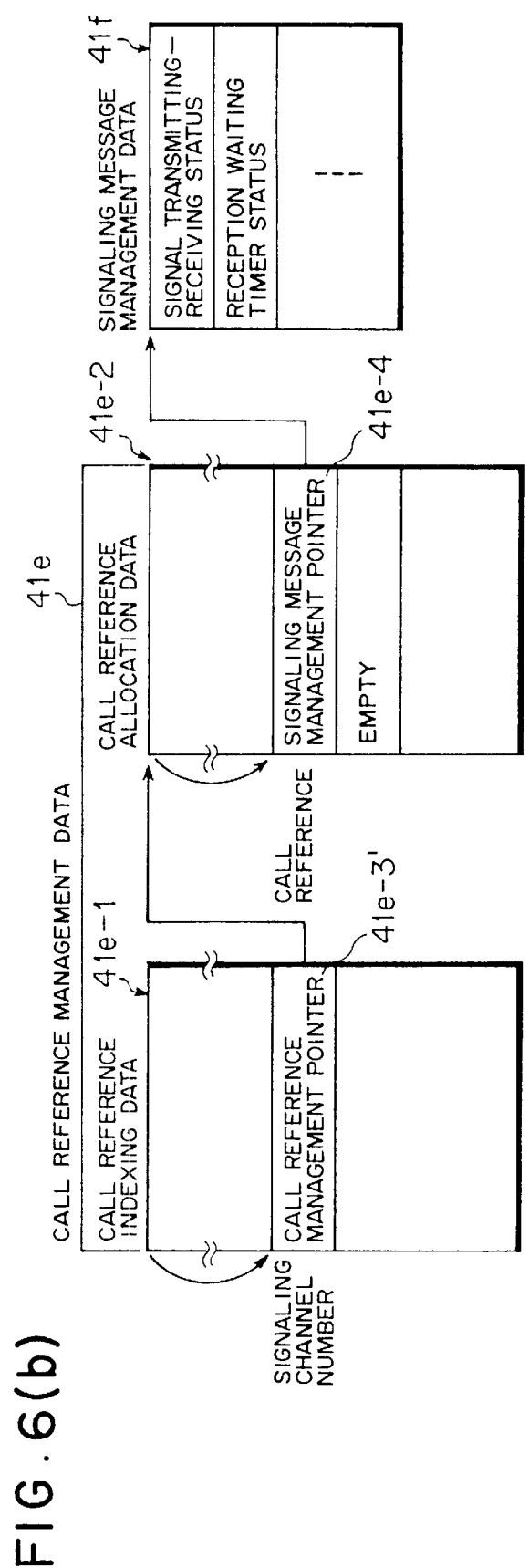
FIG. 6(a)
FIG. 6(b)

SWITCHING SYSTEM, A SUBSCRIBER APPARATUS AND A SWITCHING APPARATUS

BACKGROUND OF THE INVENTION (1) Field of the Invention

The present invention relates to a switching system, a subscriber apparatus and a switching apparatus suitable for allowing a signaling channel for controlling setting of a virtual connection (for setup) between a switching apparatus and a subscriber apparatus to be redundant.

(2) Description of the Related Art

FIG. 19 is a block diagram showing an example of an ATM (Asynchronous Transfer Mode) switching system. The ATM switching system shown in FIG. 19 includes an ATM switch 100 having interface apparatus (OC3cs: Optical Carrier 3 concatenated) 101A through 101C, middle-speed interface multiplexing apparatus (MIFSHS: Middle Interface Shelf) 102A and 102B, an ATM switch unit (CRSWSH: Cell Relay Switch Shelf) 103, a central control apparatus (CC: Central Controller) 104, a main storage apparatus (MM: Main Memory) 105, a hard disk (Hard Disk Unit) 106, signaling control apparatus (BSGCS: Broadband Signaling Controllers) 107A and 107B and inter-processor control apparatus (PACs: Processor Access Controllers) 108, and a subscriber apparatus [line concentrator: HDT (Head-end Distribution Terminal)] 200 accommodating subscriber terminals (users) to provide VOD (Video On Demand) service and the like to the users.

Each of the above interface apparatus (OC3cs) 101A through 101C is an optical interface of a transmission capacity of about 155 Mb/s used in SONET (Synchronous Optical Network) conforming to SDH (Synchronous Digital Hierarchy) transmission system. If a transmission rate of video image in the above VOD service is 3.4 Mb/s using a desired moving picture compressing technique such as MPEG 2 or the like, each of the interface apparatus 101A and 101B can set a maximum of about 50 lines (channels) between the HDT 200 and itself.

Each of the middle-speed interface multiplexing apparatus (MIFSHS) 102A and 102B accommodates an appropriate number of interface apparatus of 155 Mb/s 101A through 101C, and multiplexes data (ATM cells) from each of the interface apparatus 101A through 101C in order to unify a data transmission rate to 2.4 Gb/s between the ATM switch unit 103 and itself.

The ATM switch unit 103 performs a self-routing process on the basis of tag information [an apparatus address, VPI (Virtual Path Identifier)/VCI (Virtual Channel Identifier) and the like to be described later] attached to a header of a received ATM cell to output the received cell to a relevant port.

The central control apparatus (CC) 104 collectively controls operations of the ATM switch 100 (call control such as setup, disconnecting and the like, accounting control, call history management, and the like). The central control apparatus (CC) 104 can suitably give necessary settings to the middle speed interface multiplexing apparatus (MIFSHS) 102A and 102B, and the ATM switch unit 103 through the above inter-processor control apparatus (PACs) 108, and the signaling control apparatus (BSGCS) 107A and 107B.

The main storage apparatus (MM) 105 stores software required in the operations of the central control apparatus 104 along with various data such as subscriber data, accounting data, history data and the like. The hard disk 106 backups contents stored in the main storage apparatus 105, or stores accounting data or history data of all subscribers that the main storage apparatus cannot manage.

In the switching system with the above structure, when a certain subscriber terminal (user) A requests for a communication with another subscriber terminal (user) B, for example, the request is transmitted to, for example, the interface apparatus 101A as a SETUP signal of an ATM cell through the HDT 200.

The interface apparatus 101A refers to a correspondence table 111 as shown in FIG. 20 managed by the interface apparatus 101A with a virtual connection number [VPI (Virtual Path Identifier)/VCI (Virtual Channel Identifier)= 0/5 of the SETUP signal] attached to the header of the received ATM cell as a key to obtain an apparatus address and a signaling channel number of an opposite signaling control apparatus 107A.

The obtained apparatus address and signaling channel number are attached to the received ATM cell, and sent to the ATM switch unit 103 through the middle-speed interface multiplexing apparatus 102A.

The ATM switch unit 103 allows self-routing of the received ATM cell on the basis of the apparatus address attached to the received ATM cell, and sends out the received ATM cell to the signaling control apparatus 107A from a relevant port.

The signaling control apparatus 107A converts the received ATM cell into a signaling message form, while giving a corresponding signaling channel number to the received SETUP signal by referring to a correspondence table 112 as shown in FIG. 21 with the above apparatus address as a key and transmitting the SETUP signal to the central control apparatus 104.

The central control apparatus 104 performs processes described in ① through ⑤ below on the basis of information in the SETUP signal received from the signaling control apparatus 107A.

① referring to signaling channel management data 113 as shown in FIG. 22 with the signaling channel number attached to the received SETUP signal as a key to call corresponding physical interface management data 114, further determining a physical interface number (a number of the interface apparatus 101A) and a VPI value that should be set as a virtual communication path for a source (HDT 200) from VPCI (Virtual Path Connection Identifier) that is designated in the SETUP signal;

② selecting an idle VCI in the determined VPI and determining it;

③ referring to subscriber number translation data 115 shown in FIG. 22 with a destination number set in the SETUP signal as a key to call corresponding subscriber data 116, obtaining a subscriber address of the destination;

④ calling the physical interface management data 114 corresponding (linked by a pointer) to the subscriber data 116 at the subscriber address, and determining a physical interface number (a number of the interface apparatus 101B), a VPI value and a VCI value of a virtual communication path set for the destination subscriber; and ⑤ transmitting a SETUP signal, to which a signaling channel number is attached, to the signaling control apparatus 107B accommodating a signaling channel of the destination.

The above data 113 through 116 are stored as data in a table form in the main storage apparatus 105.

When receiving the SETUP signal from the central control apparatus 104, the signaling control apparatus 107B assembles the SETUP signal into an ATM cell, while referring to a correspondence table 112 similar to that shown in FIG. 21 with the signaling channel number attached to the SETUP signal as a key to obtain an apparatus address of the opposite interface apparatus 101C, assembling the apparatus address and attaching it to the ATM cell, and sending the ATM cell to the ATM switch unit 103.

The ATM switch unit 103 transmits the received ATM cell to the interface apparatus 101C on the basis of the apparatus address attached to the received ATM cell. The interface apparatus 101C refers to a correspondence table 111 similar to that shown in FIG. 20 with the apparatus address attached to the received ATM cell as a key to obtain a virtual connection number (VPI/VCI value), sets the number to the received ATM cell, and sends out the ATM cell as a SETUP signal to the destination.

After that, signaling messages such as confirmation (SETUP ACKNOWLEDGE) of the above SETUP signal and the like are exchanged among the source, the destination and the ATM switch 100. The ATM switch 100 (central control apparatus 104) sets (notifies) the apparatus address and VPI/VCI of the opposite apparatus to each of the interface apparatus 101A and 101C on the communication route between the source and the destination determined in the above processes ①  through ⑤, whereby a mutual communication by the ATM cell through the virtual communication route becomes possible, thus a communication between the source and the destination is possible. Incidentally, a route (path) indicated by dot-dash line represents a set route for a signaling channel, whereas a route (path) indicated by broken line represents an actual communication route (virtual connection).

Heretofore, only one signaling channel 301 for transmitting signaling messages is allocated to a physical interface 300 between the ATM switch 100 and the subscriber apparatus 200, through which the signaling messages having VPCI are exchanged between the subscriber apparatus 200 and the ATM switch 100 over the signaling channel 301, as schematically shown in FIG. 23. Whereby, VPI/VCI that should be set on the side of the ATM switch 100 is calculated from VPCI, and VC (information channel) of VP 302 or 303 corresponding to the VPI/VCI is set (acquired) as a virtual connection.

In the above known switching system, only one signaling channel 301 is allocated between the ATM switch 100 and the subscriber apparatus 200 (physical interface 300), as above. Therefore, when the signaling channel 301 is unusable due to a trouble or the like, the setup control is impossible so that a communication with the subscriber apparatus 200 [SVC (Switched Virtual Channel) communication] is impossible.

In the case where only one signaling channel is allocated to the physical interface 300 as above, a load on the signaling channel is largely increased between the ATM switch and a subscriber apparatus such as a large-capacity server on which accesses are concentrated so that it takes a very long time until the communication is commenced.

Paying attention to that a plurality of signaling channels can be defined, there is a technique called virtual UNI (User Network Interface). In this technique, a range being able to control allocation of VPCI to each signaling channel is independent to each other so that it is impossible to backup by using another signaling channel at the time of a trouble or the like on a signaling channel. It is also impossible to distribute a load on a signaling channel at the time of control of setting a virtual communication route to a subscriber apparatus over each of the above signaling channels.

In view of backup, there is APS (Automatic Protection Switching) technique in a technique of multiplexing transmission route such as SDH/SONET and the like. This is, as schematically shown in FIG. 24, for example, that a switching control apparatus 400 is disposed between the ATM switch 100 and the subscriber apparatus 200 to switch an interface in service to another (standby) physical interface 300B by the switching control apparatus 400 when the (current) physical interface 300A becomes unusable due to a trouble. The switching control apparatus 400 may be included in the subscriber apparatus 200.

However, APS technique is feasible in only a transmission system having a specific transmission format such as SDH/SONET and the like, and is very costly since it is necessary to prepare transmission apparatus (physical interfaces 300A and 300B) for the current (work) and standby (protection).

SUMMARY OF THE INVENTION

In the light of the above problems, the present invention provides a switching system, and a subscriber apparatus and a switching apparatus, in which a control of setting a virtual connection to a virtual path can be done over arbitrary plural signaling channels, whereby it is possible to backup when a signaling channel becomes unusable, or distribute a load of the control of setting a virtual communication route by simultaneously using a plurality of signaling channels.

The present invention therefore provides a switching system having a subscriber apparatus accommodating subscriber terminals and a switching apparatus accommodating the subscriber apparatus via one or more physical interface (s) to allocate a plurality of virtual paths to which virtual connections may be set to the physical interface(s) to virtually-handle the physical interface(s) as one single virtual interface, the switching system comprising the switching apparatus comprising a plural-signaling-channel setting unit for setting a plurality of signaling channels for virtual connection setting control to the virtual interface, a signaling channel information storing unit for storing signaling channel information on the plural signaling channels, a virtual interface information storing unit for storing virtual interface information for uniquely identifying a virtual path to which the virtual connection should be set in the virtual interface as information in common to the signaling channel information, a virtual connection setting control unit for identifying at least a virtual path that is an object of virtual connection setting on the basis of the virtual interface information when receiving a set request for the virtual connection from the subscriber apparatus over an arbitrary signaling channel, and setting the virtual connection to the virtual path using the signaling channel over which the set request is received, the subscriber apparatus comprising a virtual interface control unit for making a set request for the virtual connection of the switching apparatus over an arbitrary signaling channel, and a connecting process unit for performing a connecting process between the virtual path to which the virtual connection is set by the switching apparatus and the subscriber terminal.

The present invention further provides a switching system comprising a subscriber apparatus accommodating subscriber terminals and a switching apparatus accommodating the subscriber apparatus via one or more physical interface (s) to allocate a plurality of virtual paths to which virtual connections may be set to the physical interface(s) to virtually-handle the physical interface(s) as one single virtual interface, the switching system characterized by that a plurality of signaling channels for virtual connection setting control are set to the virtual interface, and the virtual connection is set to an arbitrary virtual path in the virtual interface over an arbitrary signaling channel.

According to the switching system of this invention, a plurality of signaling channels for virtual connection setting control are set to the virtual interface between a subscriber apparatus and the switching apparatus, whereby control of setting the virtual connection to an arbitrary virtual path in the virtual interface is done using an arbitrary signaling channel. It is therefore possible to allow the signaling channels to be redundant, or distribute a load on signaling channels, which leads to an improvement of reliability of a connecting service (virtual connection setting control), or decrease of delay time.

The above virtual interface information storing unit of the switching apparatus may set different identification information to each virtual connection that may be set in the virtual interface, and store identification information on the physical interface and identification information on the virtual path correspondingly to the identification information. In this case, the virtual connection setting control unit of the switching apparatus identifies a physical interface and a virtual path to which a virtual connection should be set on the basis of the identification information on the virtual connection required to be set.

The switching apparatus can thereby uniquely identify a physical interface and a virtual path to which a virtual connection should be set in the virtual interface so as to certainly set a virtual connection to a desired virtual path in the virtual interface even if receiving a set request over any signaling channel.

A predetermined order of priority may be set to the above plural signaling channels, and the virtual interface control unit of the subscriber apparatus and the virtual connection setting control unit of the switching apparatus may select a signaling channel to be used according to the order of priority.

It is thereby possible to allocate a signaling channel that is of a lower priority and hardly to be selected as a backup, so that the signaling channel is redundant quite easily and reliability of the connecting service is largely improved.

Alternatively, an identical priority may be set to the plural signaling channels, and the virtual interface control unit of the subscriber apparatus and the virtual connection setting control unit of the switching apparatus may arbitrarily select and use the plural signaling channels.

It is thereby possible to control setting of different virtual connections using different signaling channels. Accordingly, a load on each signaling channel may be distributed, thus a connecting service with less delay may be provided.

The present invention still further provides a subscriber apparatus accommodating subscriber terminals while being accommodated by a switching apparatus via one or more physical interface(s) to allocate a plurality of virtual paths to which virtual connections may be set to the physical interfaces to virtually-handle the physical interface(s) as one single virtual interface, the subscriber apparatus characterized by that a plurality of signaling channels for virtual connection setting control in the virtual interface are allocated to the virtual interface, and that the subscriber apparatus comprising a virtual interface control unit for making a set request for a virtual connection of the switching apparatus using an arbitrary signaling channel in the virtual interface, and a connecting process unit for performing a connecting process between a virtual path to which the virtual connection is set by the switching apparatus and the subscriber terminal.

According to this invention, the subscriber apparatus may make a request for setting a virtual connection of the switching apparatus using an arbitrary signaling channel in the virtual interface, while performing a connecting process between a virtual path to which a virtual connection is set by the switching apparatus and the subscriber terminal. It is therefore possible to allow a signaling channel between the subscriber apparatus and the switching apparatus to be redundant and distribute a load on the signaling channel, certainly.

In the above subscriber apparatus, a predetermined order of priority may be set to the plural signaling channels, and select signaling channels to be used according to the order of priority. In this case, a signaling channel that is not selected may be used as a backup. Accordingly, it is possible to make a signaling channel to be redundant, thus largely improve reliability of the connecting service.

Alternatively, an identical priority may be set to the plural signaling channels, and plural signaling channels may be arbitrarily selected to be used, whereby a request for setting different virtual connections are made using different signaling channels. In this case, it is also possible to readily distribute a load on the signaling channel, and provide a connecting service with less delay.

At this time, different call identification information may be set to each of the set requests to be transmitted to the switching apparatus over the plural signaling channels. In this case, it is possible to avoid a phenomenon that set requests having an identical call identification information in the virtual interface are transmitted to the switching so that setting of virtual connections is infeasible. Accordingly, distribution of a load on each signaling channel is certainly realized.

The present invention still further provides a switching apparatus accommodating a subscriber apparatus via one or more physical interface(s) to allocate a plurality of virtual paths to which virtual connections may be set to the physical interface(s) to virtually-handle the physical interface(s) as one single virtual interface, the switching apparatus comprising a plural-signaling-channel setting unit for setting a plurality of signaling channels for virtual connection setting control to the virtual interface, a signaling channel information storing unit for storing signaling channel information on the plural signaling channels, a virtual interface information storing unit for storing virtual interface information for uniquely identifying a virtual path to which the virtual connection should be set in the virtual interface as information in common to the signaling channel information, and a virtual connection setting control unit for identifying a virtual path that is an object of virtual connection setting on the basis of the virtual interface information when receiving a set request for the virtual connection from the subscriber apparatus over an arbitrary signaling channel, and setting the virtual connection to the virtual path using the signaling channel over which the set request was received.

According to the switching apparatus of this invention, a plurality of signaling channels for virtual connection setting control are set to the virtual interface, and the control of setting a virtual connection to an arbitrary virtual path is conducted using an arbitrary signaling channel. It is therefore possible to allow the signaling channel between the switching apparatus and the subscriber apparatus to be redundant and distribute a load on the same, certainly.

The above virtual interface information storing unit may set different identification information to each virtual connection that may be set in the virtual interface and store identification information on the physical interface and identification information on the virtual path correspondingly to the identification information. In this case, the virtual connection setting control unit identifies a physical interface and a virtual path to which a virtual connection should be set on the basis of the identification information on the virtual connection required to be set.

The switching apparatus of this invention can thereby uniquely identify a physical interface and a virtual path to which a virtual connection should be set in the virtual interface on the basis of the identification information on the virtual connection required to be set. Accordingly, a virtual connection may be certainly set to a desired virtual path in the virtual interface even if a set request is received over any signaling channel.

The switching apparatus of this invention may further have an attribute information storing unit for storing attribute information relating to a control on the signaling channels, thereby controlling a mode of use of the signaling channels on the basis of the attribute information in the attribute information storing unit. It is thereby possible to simply define a mode of use of the signaling channels according to a setting of the attribute information to set attribute of an operation of the switching apparatus. This largely improves flexibility of modes of the connecting service, or contributes to a decrease of a load of setting in a maintenance operation.

Alternatively, attribute information for using the plural signaling channels as a current channel and a standby channel may be set to the attribute information storing unit. In this case, according to the attribute information, the virtual connection setting control unit uses the current channel in a normal state, while switching a signaling channel in use to the standby channel to use the standby channel in an emergency where a trouble occurs in the current channel and the current channel becomes unusable.

The switching apparatus uses the current channel in a normal state, while switching a signaling channel in use to the standby channel at an emergency where a trouble occurs in the current channel and the current channel becomes unusable, so that the connecting service is not unavailable for a long time, leading to a remarkable improvement of reliability of the connecting service.

Further, attribute information about whether a signaling channel in use is switched to the current channel when a trouble occurring in the current channel is recovered and the current channel becomes usable may be set to the attribute information storing unit. In this case, if the attribute information signifying that a signaling channel in use is switched is stored in the attribute information storing unit, the virtual connecting setting control unit switches the signal channel in use to the current signaling channel after recovery of the trouble, while not switching the signaling channel in use but continuously using the standby channel if attribute information signifying that the signaling channel in use is not switched is stored in the attribute information storing unit.

The switching apparatus according to this invention switches a signaling channel in use to the current channel after recovery of a trouble if attribute information signifying that the signaling channel in use is switched is set in the attribute information storing unit, that is, uses the current channel as long as the current channel is usable. This facilitates management of the signaling channel in use. On the other hand, if attribute information signifying that a signaling channel in use is not switched is set, the switching apparatus continuously uses the standby channel even after recovery of the trouble. This can avoid a condition in which the signaling channel in use is frequently switched due to repetitive occurrence/recovery of troubles within a short period, which stabilizes the connecting service.

Still further, attribute information about whether a virtual connection having been set is relieved at the time of the signaling channel switching may be stored in the attribute information storing unit. In this case, if attribute information signifying that a virtual connection is relieved is set in the attribute information storing unit, the virtual connection setting control unit continuously controls a virtual connection in communication over a signaling channel after the switching, while initializing a virtual connection setting control on all virtual paths over the signaling channel after the switching if attribute information signifying that the virtual connection is not relieved is stored in the attribute information storing unit.

If attribute information signifying that a virtual connection having been set is relieved is set in the attribute information storing unit, the switching apparatus according to this invention continuously controls a virtual connection in communication over a signaling channel after the switching, so as to avoid a condition in which disconnecting of communication cannot done normally. On the other hand, if attribute information signifying that a virtual connection is not relieved is set in the attribute information storing unit, the switching apparatus initializes virtual connection setting control on all virtual paths over a signaling channel after the switching, so as to dissolve condition non-coincidence in the setting control that possibly occurs between the switching apparatus and the subscriber apparatus during the switching of a signaling channel within a short period.

Alternatively, attribute information for selecting a plurality of arbitrary signaling channels among the plural signaling channels to use them may be set in the attribute information storing unit. In this case, the virtual connection setting control unit selects arbitrary plural signaling channels on the basis of the attribute information and controls setting of different virtual connections over the selected signaling channels.

If attribute information for selecting arbitrary signaling channels to use them is stored in the attribute information storing unit, the switching apparatus according to this invention selects arbitrary signaling channels, and controls setting of different virtual connections over the selected signaling channels. Therefore, a load on a signaling channel is distributed so that the connecting service is be done very quickly and a connecting service with less delay is provided.

Still further, attribute information about whether a backup control is conducted on a virtual connection having been set when a trouble occurs in a part of the plural signaling channels and a relevant signaling channel becomes unusable may be set in the attribute information storing unit. In this case, if attribute information signifying that the backup control is conducted is set in the attribute information storing unit, the virtual connection setting control unit uses a signaling channel other than the part of the signaling channels to control the virtual connection having been set.

If attribute information signifying that a backup control is conducted on the virtual connection having been set when a part of the plural signaling channels becomes unusable is set in the attribute information storing unit, the switching apparatus according to this invention uses a signaling channel other than the part of the signaling channels to control the virtual connection having been set, thereby backing up a channel in which a trouble occurs while distributing a load on a signaling channel, which leads to a decrease of a delay time in the connecting service and a large improvement of the reliability.

Still further, attribute information about whether the virtual connection having been set is relieved at the time of the backup control may be set in the attribute information storing unit. In this case, if attribute information signifying that a virtual connection is relieved is set in the attribute information storing unit, the virtual connection setting control unit continues a control on a virtual connection in communication over another signaling channel to conduct the backup control.

If attribute information signifying that the virtual connection having been set is relieved at the time of the backup control is set in the attribute information storing unit, the switching apparatus according to this invention continues a control on a virtual connection in communication over another signaling channel to conduct the backup control. In this case, it is possible to avoid a condition in which disconnecting of a communication cannot be normally done.

The virtual connection setting control unit may use a plurality of arbitrary signaling channels to control setting of virtual connections in response to set requests having different call identification information.

The switching apparatus according to this invention controls setting of virtual connections in response to set requests having different call identification information, using arbitrary signaling channels. It is therefore possible to avoid a phenomenon that the switching apparatus accepts set requests having identical call identification information in the virtual interface, thus cannot set virtual connections since the switching apparatus cannot identify the set requests, and to realize distribution of a load on the signaling channel.

The switching apparatus according to this invention may further have an attribute information altering unit for altering setting of the attribute information in the attribute information storing unit according to an attribute information alter signal from a maintenance terminal for the switching apparatus.

When receiving an attribute information alter signal from the maintenance terminal, the switching apparatus according to this invention may alter setting of the attribute information in the attribute information storing unit. This largely improves versatility of the switching apparatus and flexibility of the provided connecting service.

The present invention still further provides a switching apparatus connected to a subscriber apparatus accommodating subscriber terminals via a plurality of physical lines to accept a request for set from the subscriber terminal over a signaling channel of the physical lines and acquiring an information channel of the physical lines in response to the request for set, the switching system characterized by that the switching apparatus acquires an information channel of a physical line different from a physical line to which a signaling channel over which the request for set is transmitted belongs as an information channel in response to the request for set.

The switching apparatus according to this invention can continue a control on an acquired information channel even if a signaling channel of a physical line to which the acquired information channel becomes unusable, so that reliability of the connecting service is largely improved.

BRIEF DESCRIPTION OF THE DRAWINGS

FIGS. 6(a) and 6(b) are diagrams for illustrating the call reference management in the ATM switch according to this embodiment, compared with the known manner;

DESCRIPTION OF THE PREFERRED EMBODIMENTS

Hereinafter, description will be made of embodiments of this invention.

Figure 1:
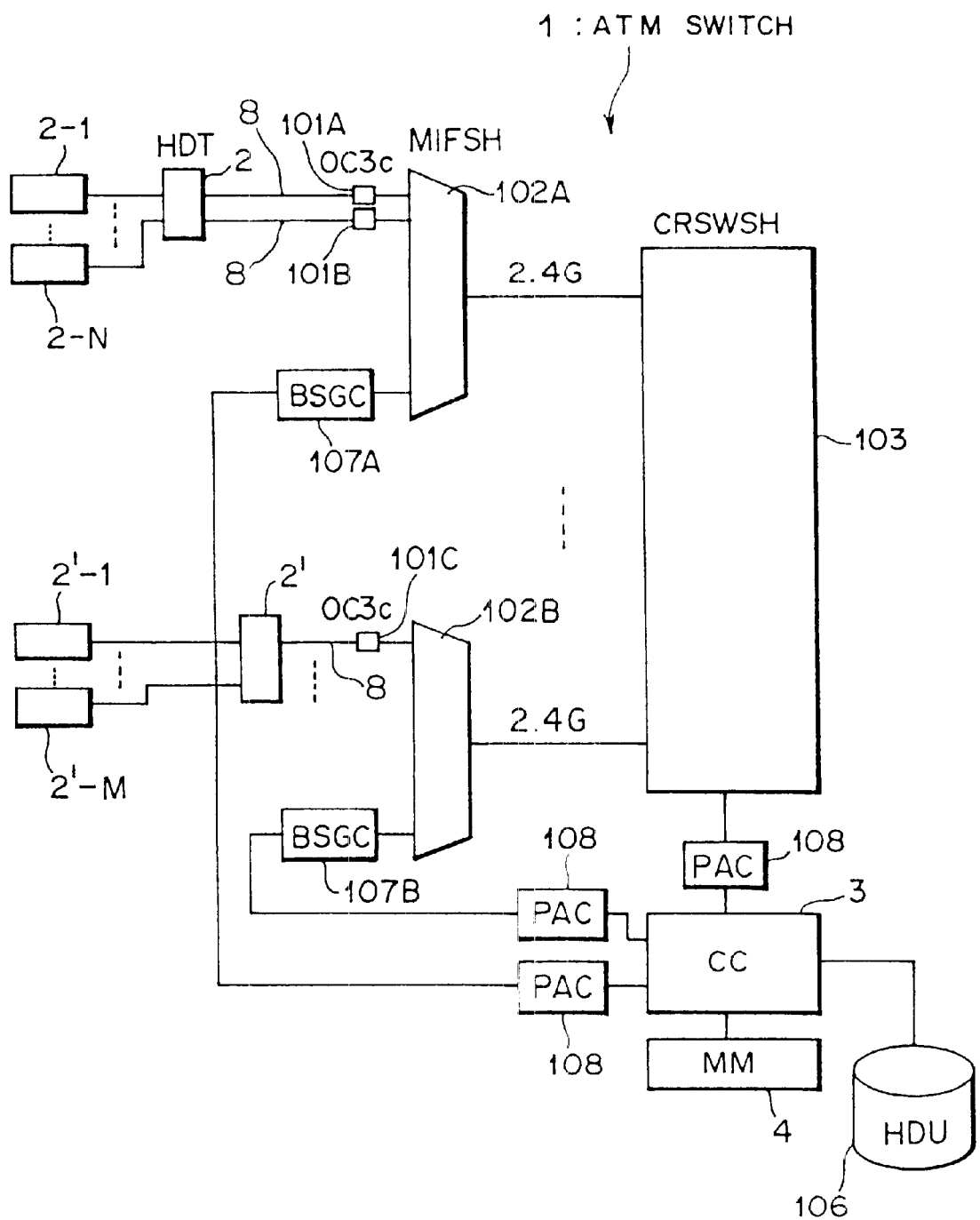
FIG. 1 is a block diagram showing a structure of an ATM switching system according to an embodiment of this invention.

FIG. 1 is a block diagram showing an ATM switching system according to an embodiment of this invention. An ATM switching system shown in FIG. 1 has subscriber apparatus (HDTs) 2 and 2' accommodating subscriber terminals (users) 2-1 through 2-N and 2'-1 through 2'-M (N and M are natural numbers), respectively, and an ATM switch 1 accommodating the HDTs 2 and 2'. The ATM switch 1 has a central control apparatus (CC) 3 and a main storage apparatus (MM) 4, along with interface apparatus (OC3cs) 101A through 101C, middle-speed interface multiplexing apparatus (MIFSHs) 102A and 102B, an ATM switch unit (CRSWSH) 103, a hard disk 106, signaling control apparatus (BSGCS) 107A and 107B and inter-processor control apparatus (PACs) 108.

Figure 2:
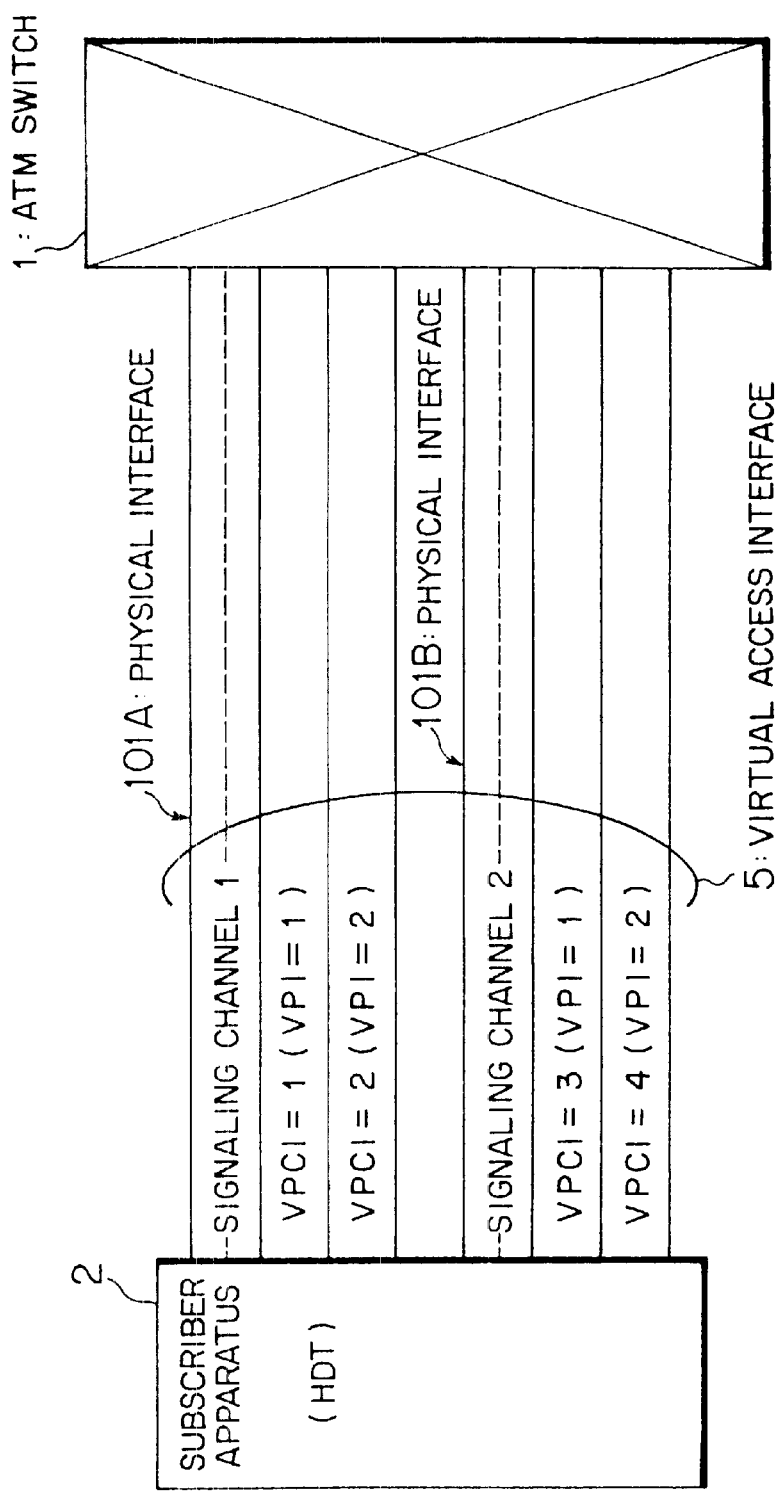
FIG. 2 is a schematic diagram for illustrating a virtual access interface according to the embodiment.
Figure 19:
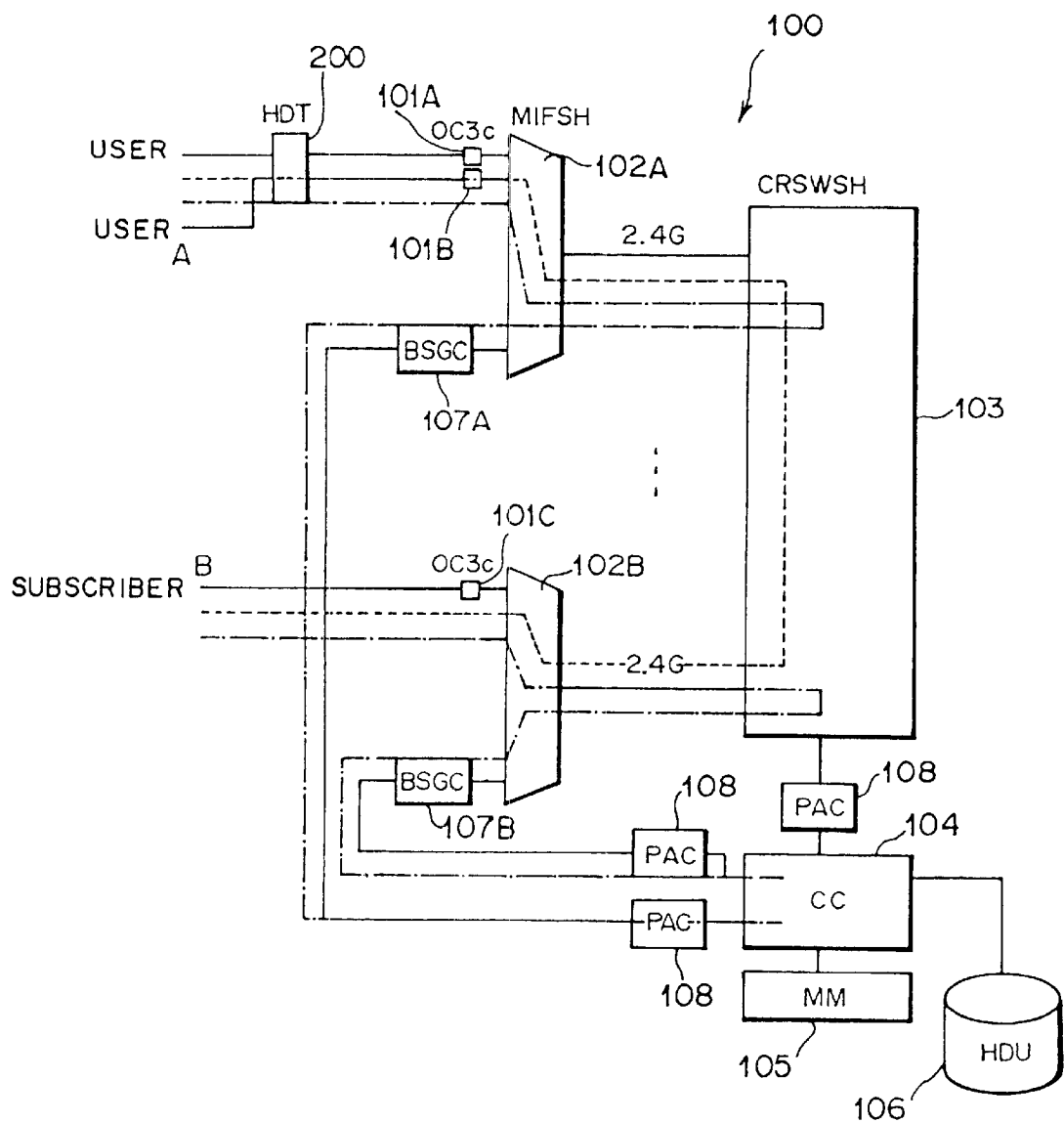
FIG. 19 is a block diagram showing an example of an ATM system.

The ATM switch (switching apparatus) 1, basically, has similar functions as those described with reference to FIG. 19, which is connected to the HDTs 2 and 2' accommodating the subscriber terminals 2-1 through 2-N and 2'-1 through 2'-M via a plurality of physical lines 8 to accept a request for call setting (SETUP signal) from each of the subscriber terminals 2-1 through 2-N and 2'-1 through 2'-M over a signaling channel of a corresponding physical line 8, and acquires an information channel of the physical line 8 in response to the above SETUP signal. According to this embodiment, as schematically shown in FIG. 2, for example, setting is done by the central control apparatus 3 and the main storage apparatus 4 such that a plurality of virtual paths (information channels: VPI=1, 2) to which virtual connections (VPCs) can be set (acquired) are allocated to each of the interface apparatus (physical interfaces) 101A and 101B so that each of the interface apparatus 101A and 101B can be virtually-handled as a single virtual access interface 5.

Figure 20:
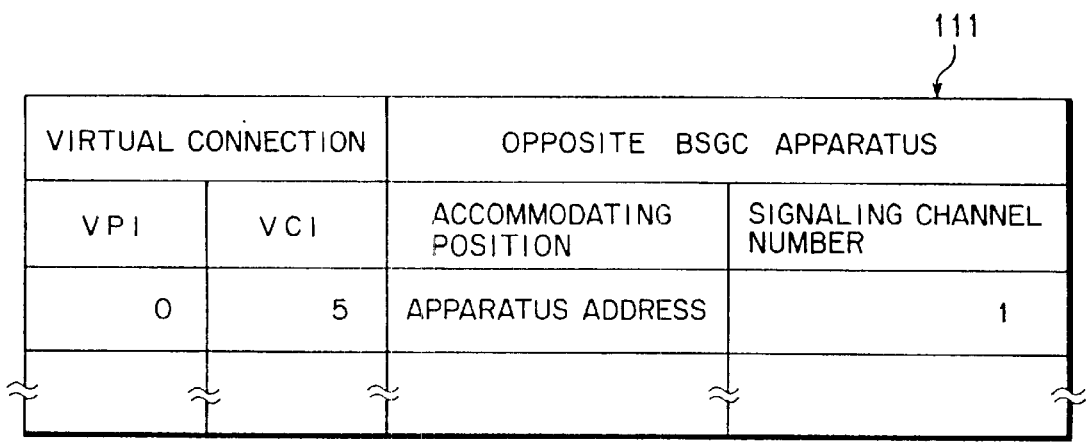
FIG. 20 is a diagram showing an example of a correspondence table provided in an interface apparatus (OC3c)
Figure 21:
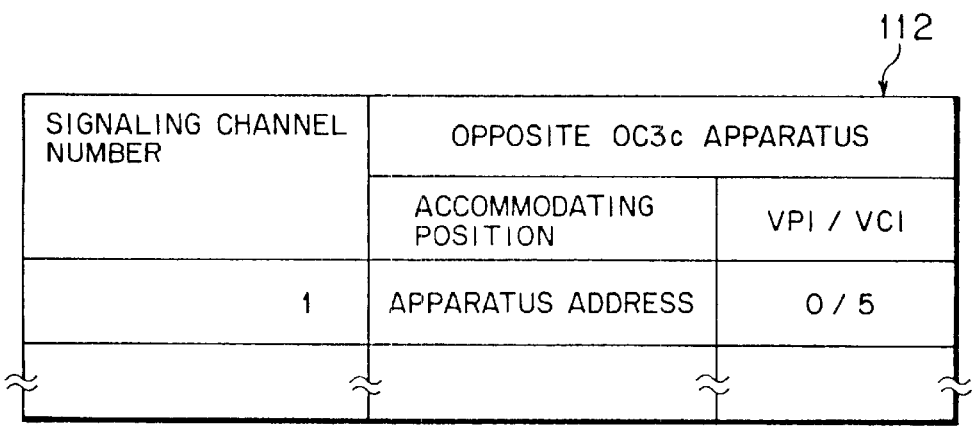
FIG. 21 is a diagram showing an example of a correspondence table provided in a signaling control apparatus (BSGC)
Figure 22:
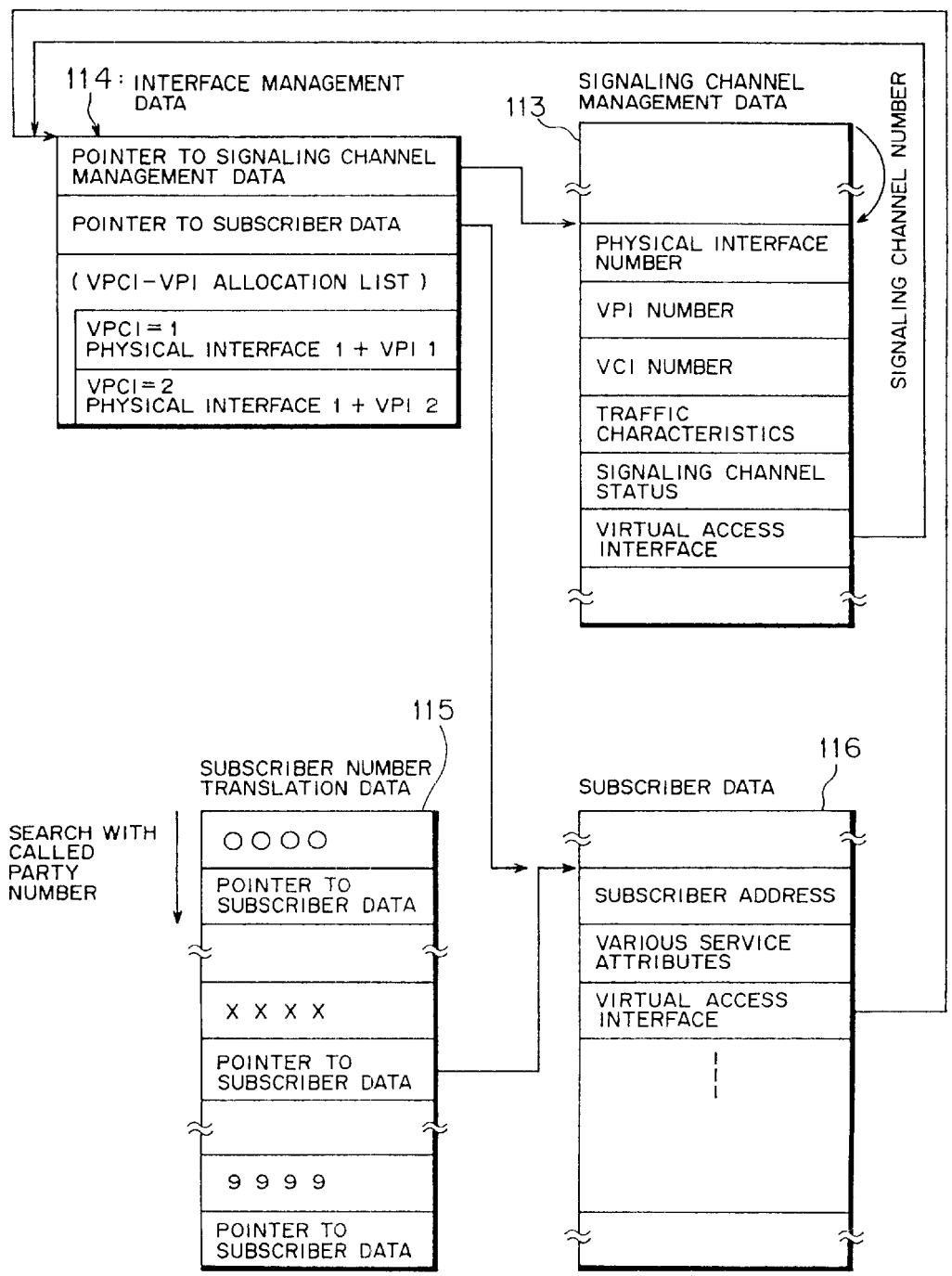
FIG. 22 is a diagram schematically showing an example of structures of various data stored in a main storage apparatus in an ATM switch.
Figure 23:
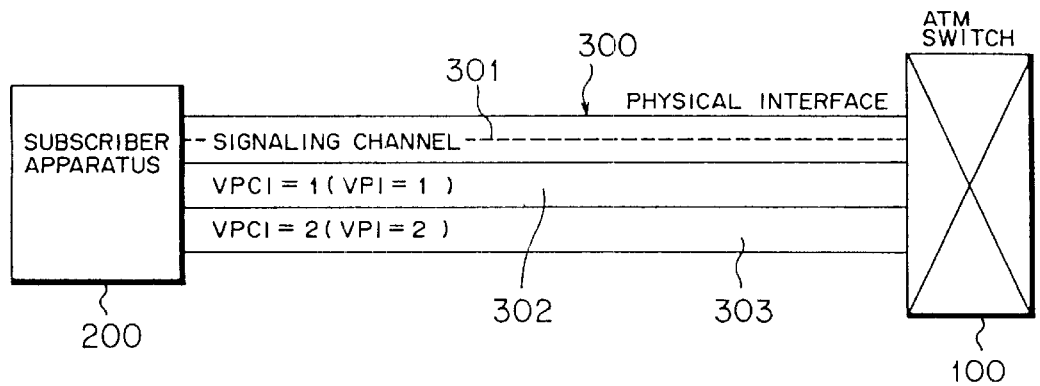
FIG. 23 is a schematic diagram for illustrating a signaling channel structure.
Figure 24:
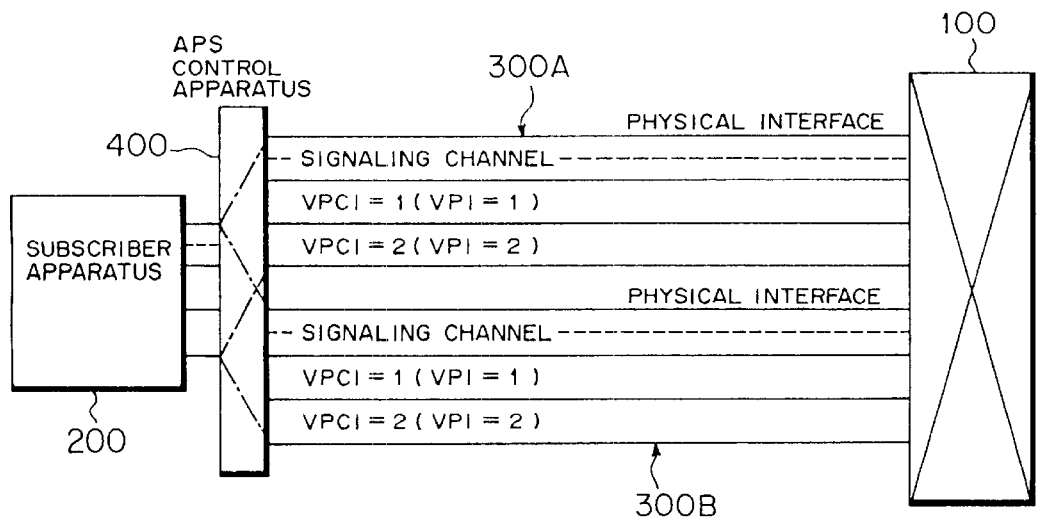
FIG. 24 is a schematic diagram for illustrating APS technique.

According to this embodiment, each of the interface apparatus (OC3cs) 101A through 101C and the signaling control apparatus (BSGCS) 107A and 107B has correspondence tables 111 and 112 as shown in FIGS. 20 and 21. When a virtual connection is set, a signaling channel number is attached to a signaling message (SETUP signal) in each of the signaling control apparatus 107A and 107B, and handed to the central control apparatus 3, like heretofore.

According to this embodiment, the central control apparatus 3 and the main storage apparatus 4 conduct setting such that, in the virtual access interface 5, identification information (VPCI) on the virtual connection is a unique value for each VP (here, VPCI=1 through 4), and two signaling channels "1" and "2" for controlling virtual connection setting are set to the virtual access interface 5.

Figure 3:
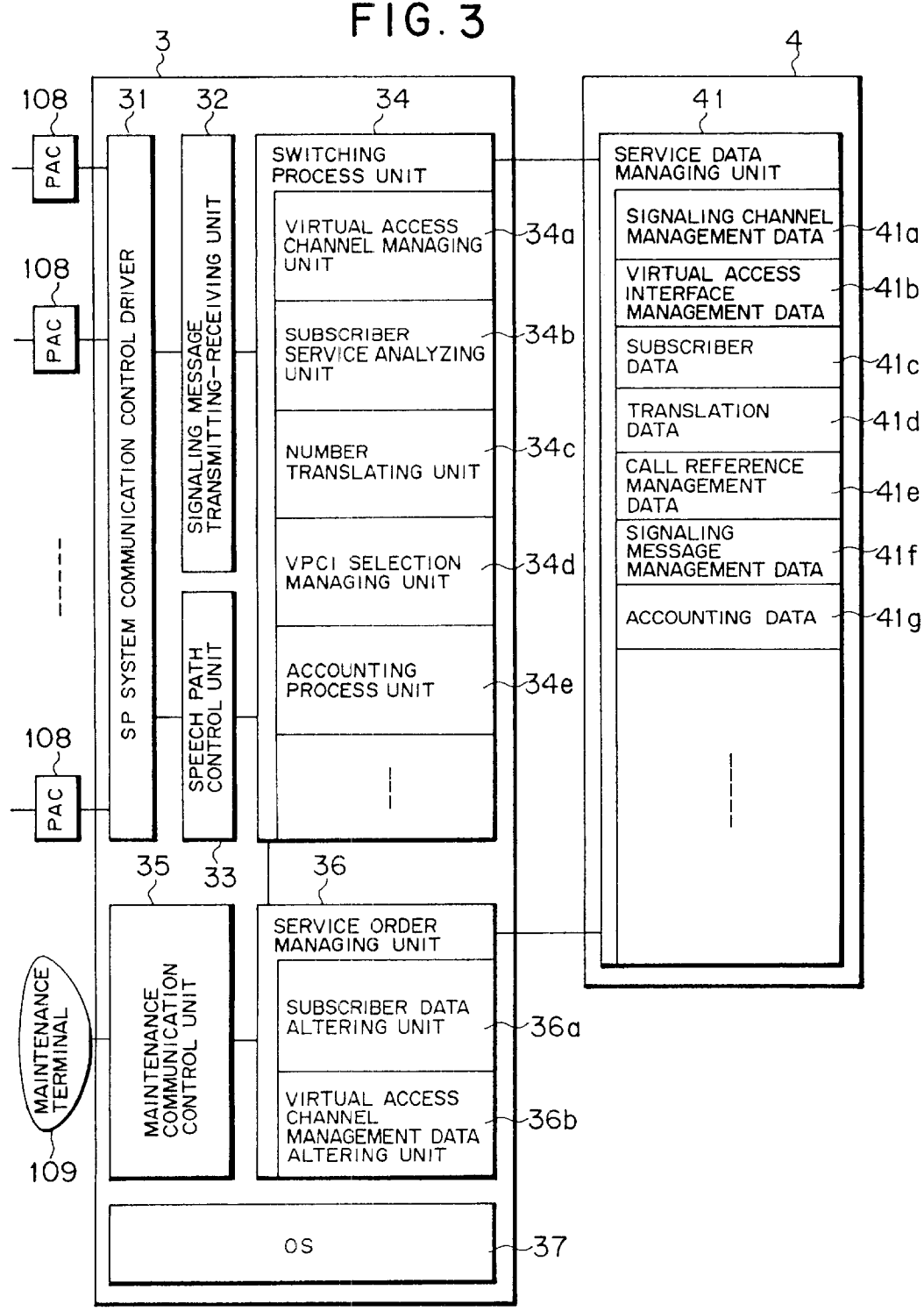
FIG. 3 is a block diagram showing a structure of an ATM switch according to the embodiment.

For this, the central control apparatus 3 and the main storage apparatus 4 according to this embodiment have structures as shown in FIG. 3, for example, when paying attention to main functions. Namely, the central control apparatus 3 has an SP (Speech Path) system communication control driver 31, a signaling message transmitting-receiving unit 32, a speech path control unit 33, a switching process unit 34, a maintenance communication control unit 35, a service order managing unit 36 and an operating system (OS) 37, whereas the main storage apparatus 4 has a service data managing unit 41.

In the main storage apparatus 4, the service data managing unit 41 stores and manages signaling channel management data 41a, virtual access channel (virtual access interface management) data 41b, subscriber data 41c, translation data 41d, call reference management data 41e, signaling message management data 41f, accounting data 41g and the like. According to this embodiment, it is possible to set, add, change, delete, or the like at least the data 41a through 41c through the service order managing unit 36 of the central control apparatus 3 from a maintenance terminal 109. Incidentally, each of the above data 41a through 41g is stored and managed as data in a table form.

Figure 4:
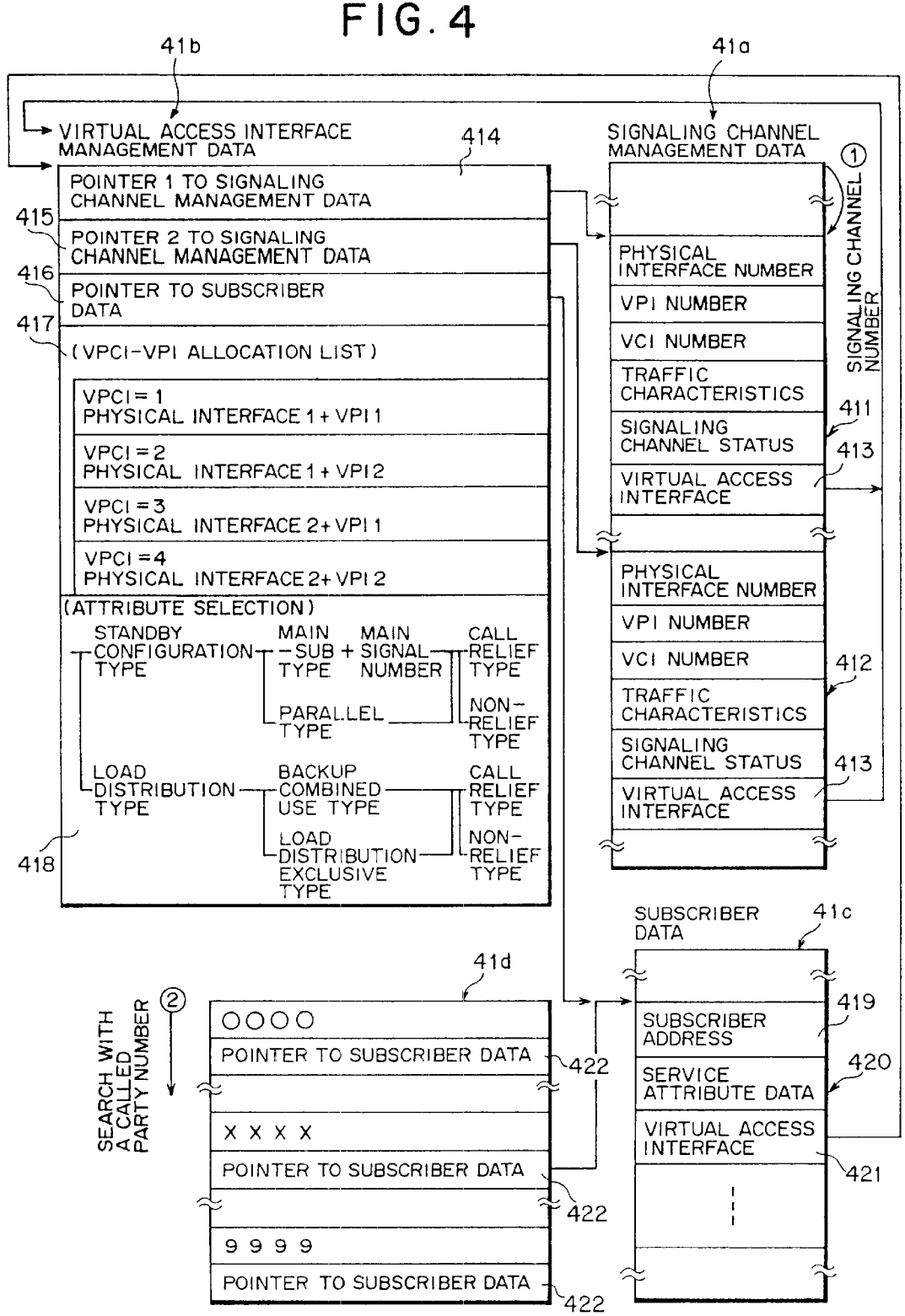
FIG. 4 is a diagram schematically showing an example of structures of various data stored in a service data managing unit in the ATM switch according to the embodiment.

In concrete, the above signaling channel management data 41a has, as shown in FIG. 4, for example, signaling channel data 411 and 412 for the signaling channels "1" and "2", in each of which a physical interface number (apparatus addresses of the interface apparatus 101A or 101B) of being set the signaling channel "1" or "2", VPI/VCI of the signaling channel "1" or "2", traffic characteristics, signaling channel status of the signaling channel "1" or "2" and the like are registered. By setting the plural signaling channel data 411 and 412 as above, a plurality of signaling channels "1" and "2" are set in the virtual access interface 5.

Namely, the service data managing unit 41 according to this embodiment functions as a signaling channel information storing unit for storing the signaling channel data 411 and 412 about a plurality of signaling channels "1" and "2". In each of the signaling channel data 411 and 412, there is also set a pointer 413 to the virtual access interface management data 41b, by which the signaling channel data 411 and 412 are linked to each other, and the virtual access interface management data 41b can be thereby referred to from either the signaling channel data 411 or 412. Setting of the above signaling channels "1" and "2" is done by the service order managing unit 36 functioning as plural-signaling-channel setting unit to be described later in this embodiment.

The virtual access interface management data 41b has, as shown in FIG. 4, pointers 414 and 415 to the respective channel data 411 and 412, a pointer 416 to the subscriber data 41c, a VPCI-VPI allocation list 417, attribute data 418 and the like.

In the above VPCI-VPI allocation list 417, there are set different identification information (VPCI=1 through 4) for each virtual connection that can be set in the virtual access interface 5, and numbers of the interface apparatus 101A and 101B (physical interface numbers "1" and "2") and VPIs corresponding to the respective VPCI. Whereby, the central control apparatus 3 can uniquely identify a VP to which a virtual connection should be set by, not the signaling channel "1" or "2", but VPCIs, in the virtual access interface 5, as will be described later.

Namely, the service data managing unit 41 according to this embodiment also functions as a virtual interface information storing unit for storing the virtual access interface management data (virtual interface information) 417 for uniquely identifying a virtual path to which a virtual connection should be set as common data to the signaling channel data 411 and 412.

The ATM switch 1 can thereby control setting of a virtual connection to an arbitrary (desired) VP in the virtual access interface 5 using an arbitrary signaling channel "1" or "2" (that is, can set a virtual connection to a desired VP within the virtual access interface 5 when receiving an SVC connect request over any signaling channel "1" or "2").

Namely, the ATM switch 1 can acquire VP on the physical line 8 different from the physical line 8 to which the signaling channel "1" or "2", over which the SVC connect request is sent, belongs, as VP in response to the above SVC connect request. It is therefore possible to allow a signaling channel to be redundant or distribute a load on the signaling channel "1" or "2", which leads to an improvement of the SVC connecting service (virtual connection setting control) or a decrease of a delay time.

In the above attribute data 41g, there are set (stored) attribute information about use modes (controls) of the signaling channels "1" and "2" as described ① through ④ below. According to this embodiment, the switching process unit 34 of the central control apparatus 3 controls the signaling channels "1" and "2", to be used according to the attribute information, as will be described later.

① attribute information for identifying either "standby configuration type" or "load distribution type" (whether the signaling channels "1" and "2" are used as a current channel and a standby channel, or the signaling channels "1" and "2" are used independently from each other");

② attribute information for identifying either "main-sub type" or "parallel type" in the case of the "standby configuration type" (attribute information about whether a signaling channel in use is switched to a current channel when a trouble occurring in the current channel is recovered and the current channel becomes usable);

③ attribute information for identifying either "load distribution exclusive type" or "backup (standby) combined use type" in the case of the "load distribution type" (attribute information about whether a back-up control is conducted on a virtual connection (call) having been set when a trouble occurs in either the signaling channel "1" or "2" and the signaling channel "1" or "2" becomes unusable); and ④ attribute information for identifying either "call relief type" or "non-relief type" (attribute information about whether a virtual connection (call) having been set is relieved when a signaling channel in use is switched).

The above service data managing unit 41 also functions as an attribute information storing unit for storing attribute information about controls on the signaling channels "1" and "2". In the ATM switch 1, a use mode of the signaling channels "1" and "2" is defined according to the above attribute information ① through ④, whereby an attribute of the operation of the ATM switch 1 is set. It is therefore possible to improve flexibility of modes of the SVC connection service, or decrease a burden of the setting in the maintenance operation.

The subscriber data 41c is set correspondingly to the number of subscribers, in which, as shown in FIG. 4, there are set subscriber address data 419, service attribute data 420 and the like. In the translation data 41d, there is set a pointer 422 to corresponding subscriber data 41c, it is thereby possible to refer to arbitrary subscriber data 41c (subscriber address data 419) with a called party number set in the SETUP signal as a key (namely, it is possible to determine an address of a destination). Incidentally, each of the subscriber data 41c is linked to the virtual access interface management data 41b by a pointer 421.

Figure 5A:
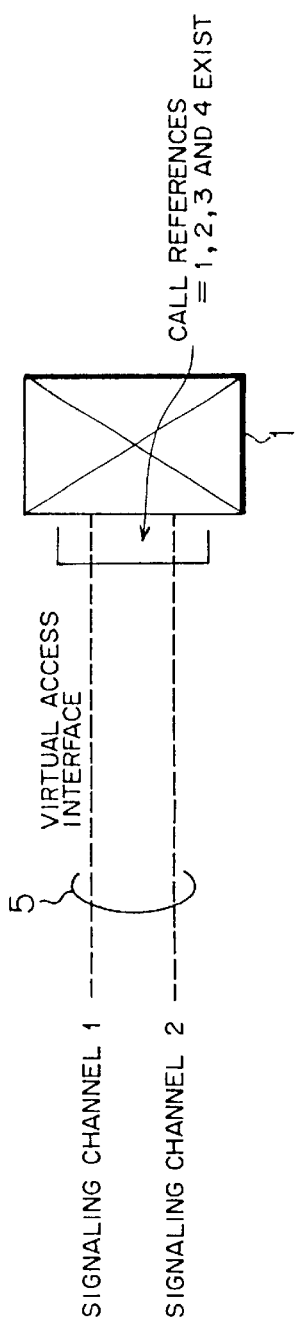
FIGS. 5(a) and 5(b) are diagrams for illustrating call reference management in the ATM switch according to the embodiment.
Figure 5B:
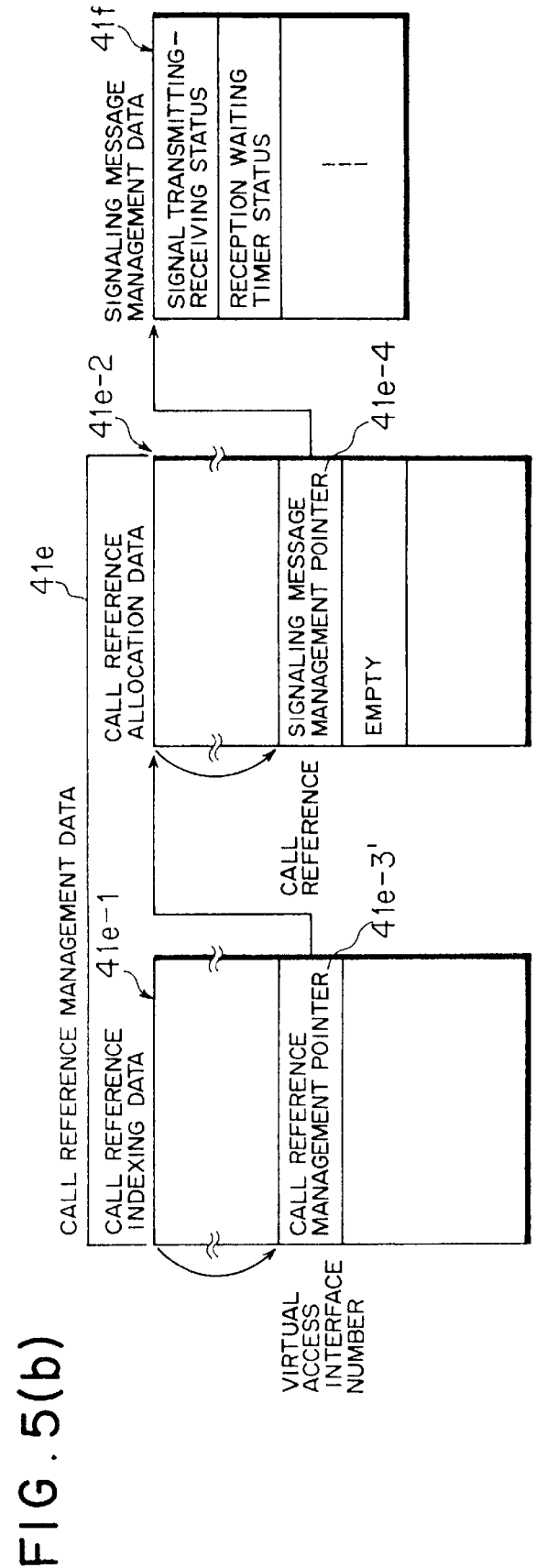

The call reference management data 41e is served to manage allocation of a call reference (call identification information). According to this embodiment, as shown in FIG. 5(b), for example, call reference indexing data 41e-1 and call reference allocation data 41e-2 are linked by a call reference management pointer 41e-3 corresponding to a virtual access interface number, besides the call reference allocation data 41e-1 and the signaling message management data 41f are linked by a signaling message management pointer 41e-4, whereby a call reference of a signaling message is managed correspondingly to the virtual access interface 5.

The above management enables to allocate call references different from one another to signaling messages exchanged over the signaling channels "1" and "2" in the virtual access interface 5 [refer to FIG. 5(a)], so that if the switching process unit 34 executes a control (to be described later) of "load distribution type", the call references are not duplicated. It is therefore possible to normally control the signaling channels "1" and "2" independently, or control switching between the signaling channels "1" and "2".

Heretofore, as shown in FIG. 6(b), the call reference indexing data 41e-1 and the call reference allocation data 41e-2 are linked by the call reference management pointer 41e-3' corresponding to a signaling channel number, whereby a call reference of a signaling message is managed correspondingly to the signaling channel number. Accordingly, the same call reference exists on the signaling channels "1" and "2", as shown in FIG. 6(a).

In the central control apparatus 3 shown in FIG. 3, the SP system communication control driver 31 controls DMA transfer between the central control apparatus 3 and the ATM switch unit (CRSWSH) 103, the signaling control apparatus (BSGC) 107A or 107B via the inter-processor control apparatus 108. The signaling message transmitting-receiving unit 32 analyzes contents of a signaling message of the received SETUP signal, or edits, assembles, etc., a signaling message to be transmitted.

The speech path control unit 33 manages a band of a cell data communication route (path) to the ATM switch unit 103, or edits a set/release order. The switching process unit (virtual connection setting control unit) 34 collectively controls the SVC connecting process (setting of a virtual connection) between a source and a destination through the above speech path control unit 33. According to this embodiment, when receiving the SETUP signal (SVC connect request) over an arbitrary signaling channel "1" or "2" from the HDT 2, the switching process unit 34 identifies the interface apparatus 101A or 101B and a virtual path (VPI) corresponding to VPCI that is an object of the SVC connection on the basis of the above virtual access interface management data 41b, and sets a virtual connection to a relevant virtual path using the signaling channel "1" or "2" over which the above SETUP signal has been received.

Figure 7:
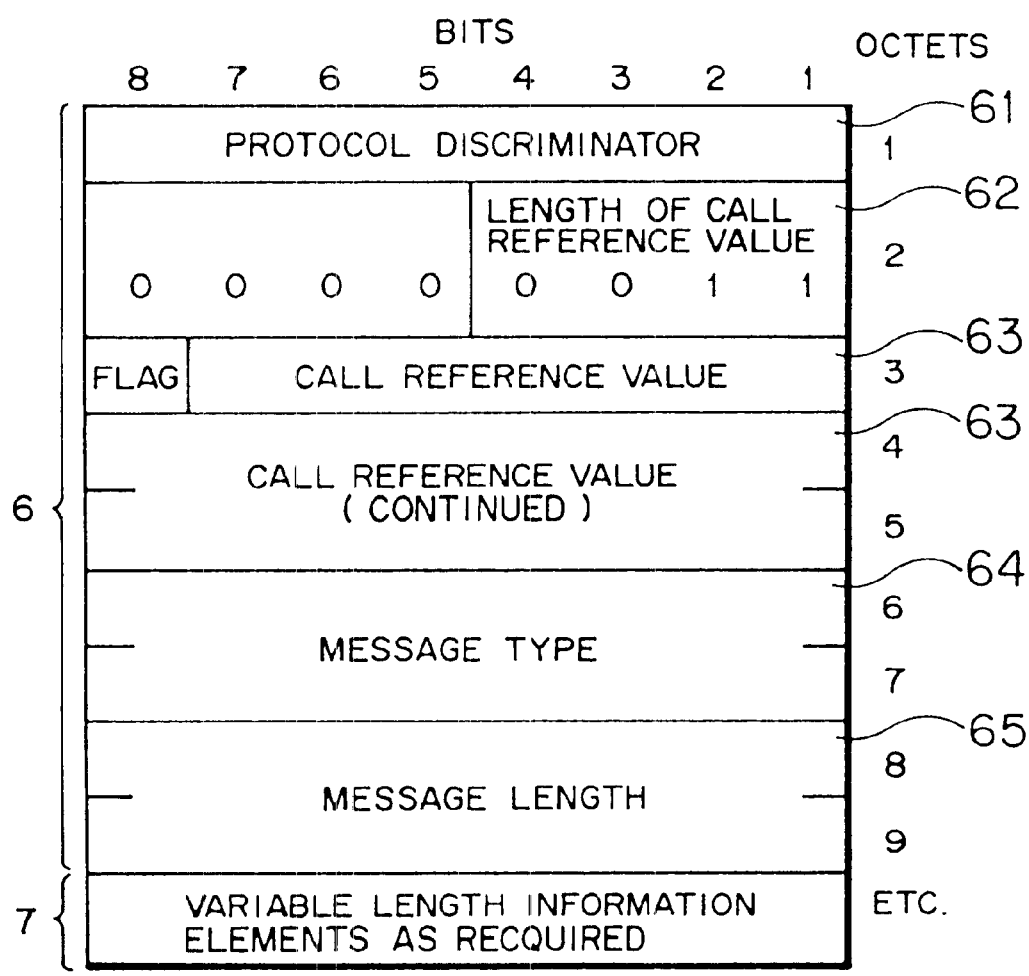
FIG. 7 is a diagram showing a format of a signaling message according to the embodiment.

According to this embodiment, a signaling message such as the above SETUP signal or the like is in conformity to a signaling system (protocol) called DSS2 (Digital Subscriber Signaling system No. 2). As shown in FIG. 7, the signaling message is basically configured with a header (common portion) of 8 bits by 9 octet and information elements (additional portion) 7 subject to the header 6.

In the above header 6, there are set a protocol discriminator 61 representing a type of protocol of the message, a call reference value 63 for identifying a call, length information 62 representing a length (octet) of the call reference value, a message type 64 representing a type of the message, length information 65 representing a length (octet) of the message type 64, and the like.

Below is an example of what the message signifies at each value of the above message type 64.

(1) 0000 0101: SETUP (setup request)

(2) 0000 1101: SETUP ACKNOWLEDGE (setup confirmation)

(3) 0000 0111: CONNECT (response)

(4) 0000 1111: CONNECT ACKNOWLEDGE (response confirmation)
(5) 0100 1101: RELEASE [disconnect (release) request]
(6) 0101 1010: RELEASE COMPLETE [disconnect (release) completion]
(7) 0000 0010: CALL PROCEEDING
(8) 0100 0110: RESTART (call initialization)
(9) 0100 1110: RESTART ACKNOWLEDGE (call initialization confirmation)
(10) 0111 0101: STATUS ENQUIRY (status inquiry)
(11) 0111 1101: STATUS (status notification)

Figure 8:
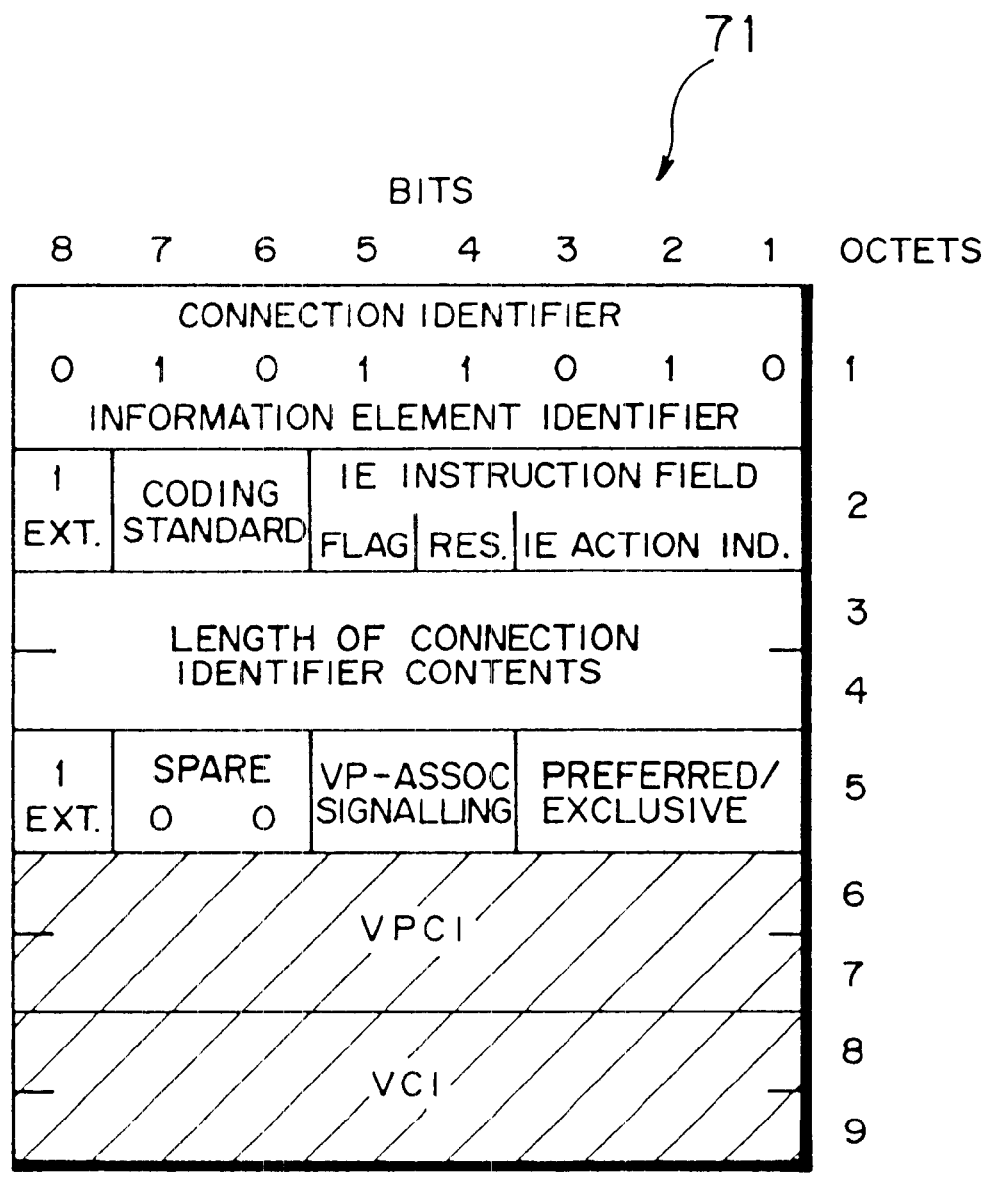
FIG. 8 is a diagram showing a format of connection identification information elements set in a SETUP signal according to the embodiment.

The information elements 7 are configured by suitably coupling some information elements to the above header 6 according to the above message type 64. In the case of the SETUP signal, for example, various information elements such as AAL (ATM Adaptation Layer) parameters, a calling party number, a called party number, a connection identifier and the like are suitably linked to the header 6, and VPCI and VCI are generally, as shown in the shaded portion in FIG. 8, set in a connection identifier 71 on the side of the HDT 2, as shown by a shaded portion, to designate a virtual path and a virtual channel to which a virtual path connection should be set.

In order to accomplish the above functions, the above switching process unit 34 has a virtual access channel managing unit 34a, a subscriber service analyzing unit 34b, a number translating unit 34c, a VPCI selection managing unit 34d, an accounting process unit 34e and the like.

When receiving the SETUP signal from the side of the HDT 2, the virtual access channel managing unit 34a identifies and determines the interface apparatus 101A or 101B and a virtual path (VPI) corresponding to VPCI set in the virtual connection identifier 71 (refer to FIG. 8) of the SETUP signal on the basis of the signaling channel management data 41a and the virtual access interface management data 41b (VPCI-VPI allocation list 417) stored and managed in the service data managing unit 41 of the main storage apparatus 4.

If the above VPCI is not set in the received SETUP signal, VPCI selected by the VPCI selection managing unit 34d is used. The virtual access channel managing unit 34a also has a function of determinig (selecting) a signaling channel to be used or conducting a switching control on the basis of attribute data 418 of the virtual access interface management data 41b so as to conduct controls described in (1) through (8) below.

(1) in the case where the "standby configuration type" is set in the attribute data 418: in a normal state, using a current channel (for example, signaling channel "1") in a higher priority, whereas switching a signaling channel in use to a standby channel (signaling channel "2") to use the standby channel "2" when a trouble occurs in the current channel "1" and the current channel "1" becomes thus unusable;

(2) when the "load distribution type" is set in the attribute data 418: selecting the signaling channels "1" and "2" as signaling channels to be used, conducting the SVC connecting control in response to SVC connect requests from different subscriber terminals 2-i using the signaling channels "1" and "2";

(3) in the case where the "backup combined use type" is set in the attribute data 418: selecting a signaling channel other than a signaling channel in which a trouble occurs, and conducting a control on a call set by the signaling channel in which the trouble occurs using the selected signaling channel (backup control);

(4) in the case where the "load distribution type" is set in the attribute data 418: not conducting the above backup control;

(5) in the case where the "main-sub type" (attribute information signifying a switching of a signaling channel in use) is set in the attribute data 418: switching a signaling channel in use from a sub (standby) signaling channel "2" to a main signaling channel "1" after a trouble in the main (current) signaling channel "1" is recovered, that is, using the main signaling channel "1" as long as the main signaling channel "1" is usable, although setting a relation between main and sub (priority) in advance to the signaling channels "1" and "2" (here, adding a signaling channel number to be main to the attribute data 418, for example);

(6) in the case where the "parallel type" (attribute information signifying that a signaling channel in use is not switched) is set in the attribute data 418: not switching the signaling channel in use to a main signaling channel "1" even when a trouble occurring in the main signaling channel "1" is recovered, but continuously using a standby channel "2";

(7) in the case where the "call relief type [attribute information signifying that a virtual connection (call) having been set is relieved] is set in the attribute data 418: continuously controlling a virtual connection in communication over a switched signaling channel, thereby relieving a call, provided that only a call whose status of a response (STATUS signal) to a status inquiry message (STATUS ENQ signal) matches is relieved, as will be described later, according to this embodiment; and (8) in the case where the "non-relieve type" [attribute information signifying that a virtual connection (call) having been set is not relieved] is set in the attribute information 418: sending an initialize message (RESTART signal) over a switched signaling channel to initialize all calls (controlling a setting of a virtual connection for a virtual path), although not sending the initialize message to perform no particular process in the case of the "load distribution type".

The subscriber service analyzing unit 34b controls providing/non-providing of a service according to subscriber contract on the basis of the subscriber data 41c (service attribute data 420) stored in the service data managing unit 41 of the main storage apparatus 4. The subscriber service analyzing unit 34b can provide a source number notifying service by setting the service attribute data 420, for example.

The number translating unit 34d refers to the translation data 41d and the subscriber data 41c with a called party number set in the SETUP signal received through the signaling message transmitting-receiving unit 32 to obtain the subscriber address data 419 of a destination, thereby determining the destination. The VPCI selection managing unit 34d selects VPCI in a usable state from the VPCI-VPI allocation list 417 of the virtual access interface management data 41b when no VPCI is set in the virtual connection identifier 71 of the SETUP signal received through the signaling message transmitting-receiving unit 32.

The accounting process unit 34e generates the accounting data 41g in which information on a source (subscriber terminal 2-i, for example) and a destination (subscriber terminal 2-j, for example), and a total number of communication cells in communication (while a virtual connection is set) and the like are stored, and stores it in the service data managing unit 41.

The maintenance communication control unit 35 analyzes contents of a maintain order (maintain command: attribute information alter signal) given through the maintenance terminal 109, or requests the service order managing unit 36 to set/add/alter/delete various data 41a through 41c stored and managed in the service data managing unit 41 of the main storage apparatus 4 according to a result of the contents analysis. The service order managing unit 36 sets/adds/alters/deletes the various data 41a through 41c in response to a request from the maintenance communication control unit 35. For this purpose, the service order managing unit 36 has a subscriber data altering unit 36a, a virtual access interface management data altering unit 36b and the like.

The service order managing unit 36 fulfils a function as a plural-signaling-channel setting unit for setting signaling channel data 411 and 412 relating to the above signaling channels "1" and "2", and a function of an attribute information altering unit for altering the setting of the attribute data 418 in the virtual access interface management data 41b in response to a maintain command from the maintenance terminal 109.

The ATM switch 1 can alter the setting of the attribute data 418 in response to a maintain command when receiving the maintain command (attribute information alter signal) for altering the setting of the attribute data 418 from the maintenance terminal 109, which largely improves versatility and flexibility of the provided SVC connecting service.

Figure 9:
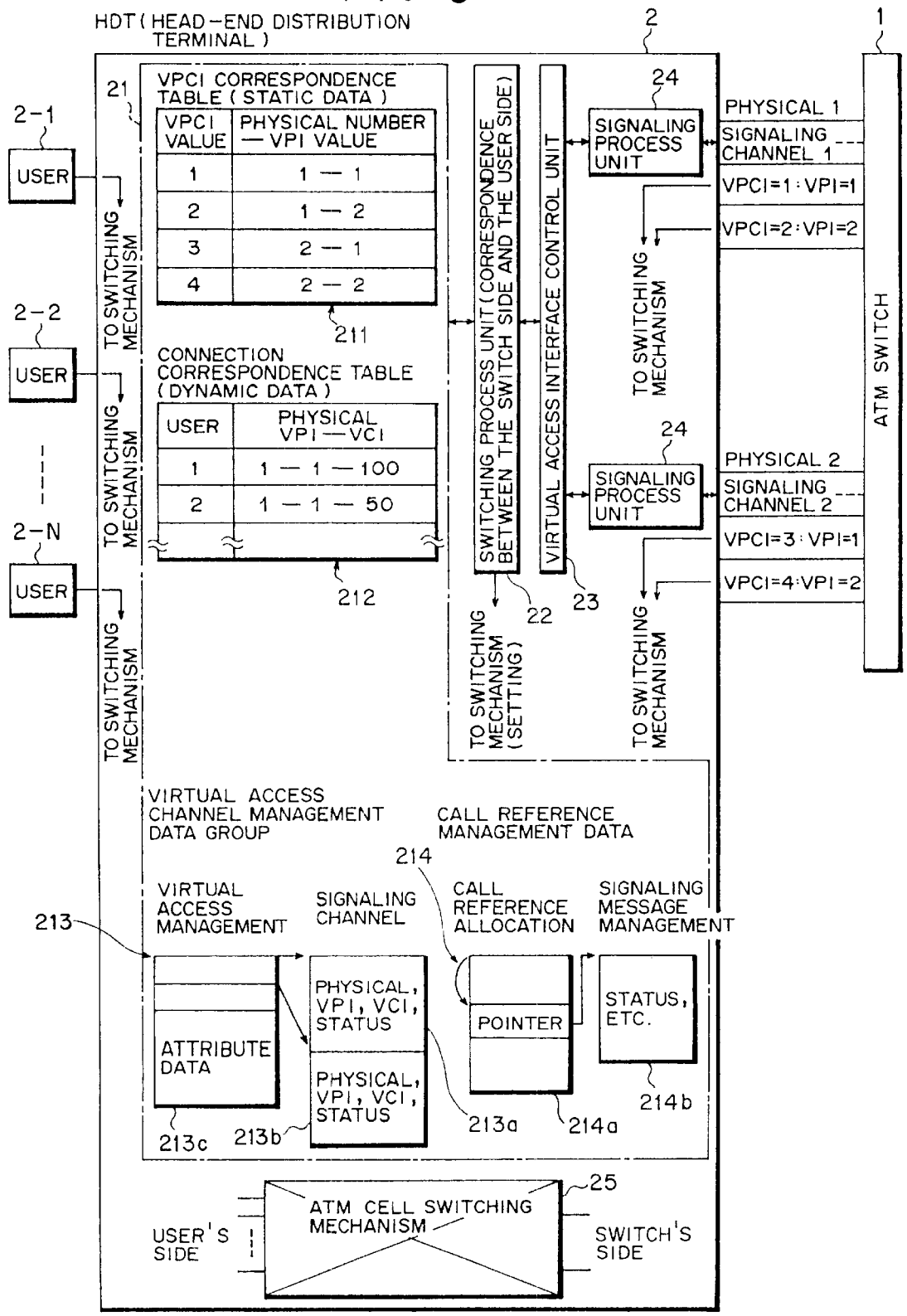
FIG. 9 is a block diagram showing a structure of an essential part of a subscriber apparatus (HDT) according to the embodiment.

FIG. 9 is a block diagram showing a structure of an essential part of the above HDT 2. As shown in FIG. 9, the HDT 2 (subscriber apparatus) according to this embodiment has a storing unit 21, a switching process unit 22, a virtual access interface control unit 23, signal processing units 24 and an ATM cell switching mechanism 25.

The storing unit 21 stores various data required in a switching process between the subscriber terminal 2-$i$ and the ATM switch 1. According to this embodiment, the storing unit 21 can store, as shown in FIG. 9, a VPCI correspondence table 211, a connection correspondence table 212, virtual access channel management data group 213 in a table form, call reference management data 214 and the like.

In order to keep a correspondence with the VPCI-VPI allocation list 417 on the side of the ATM switch 1, there is stored, in advance, in the VPCI correspondence table 211 the same information as the VPCI-VPI allocation list 417 by initial setting. In the connection correspondence table 212, there is dynamically registered information used to correspond a subscriber terminal 2-$i$ calling the SVC connect request to a virtual connection (physical interface number+VPI+VCI) set on the side of the ATM switch 1 each time a virtual connection is set.

The virtual access channel management data group 213 has signaling channel data 213a and 213b, and the attribute data 213c in which the same information contents as the signaling channel data 411 and 412, and the attribute data 418 are registered, in order to keep correspondence with the signaling channel data 411 and 412 and the attribute data 418 (refer to FIG. 4) on the side of the ATM switch 1. The call reference management data 214 is used to manage allocation of call references in order to prevent call references of signaling messages from being duplicated in the virtual access interface 5 at the time of the SVC control of the above "load distribution type", by linking the call reference allocation data 214a and the signaling message management data 214b.

The switching process unit 22 controls transmittance-reception of a signaling message on the basis of the various data stored in the above storing unit 21, thereby controlling a switching process between the side of the ATM switch 1 and the side of the subscriber terminal 2-$i$. For instance, when a setting of a virtual connection is completed on the side of the ATM switch 1 (when receiving a CONNECT signal from the ATM switch 1), the switching process unit 22 gives data stored in the connection correspondence table 212 in the storing unit 21 to the ATM cell switching mechanism 25 to establish a virtual connection between a relevant subscriber terminal 2-$i$ and the ATM switch 1.

The virtual access interface control unit 23 controls transmittance-reception of a signaling message between the HDT 2 and the ATM switch 1 on the basis of mainly the virtual access channel management data group 213 in the storing unit 21. According to this embodiment, the SVC connect request (SETUP) can be made using an arbitrary signaling channel "1" or "2".

When the "standby configuration type" is set in the attribute data 213c of the virtual access channel management data gourp 213, either the signaling channel "1" or "2" is used as a current channel at all times in a normal state. When the "load distribution type" is set, the both signaling channels "1" and "2" are used in a normal state to transmit and receive signaling messages for different virtual connections. At this time, the virtual access interface control unit 23 allocates different call references to respective signaling messages exchanged over the both signaling channels "1" and "2" on the basis of the call reference management data 214.

When the "standby configuration type" (the order of priority of the signaling channels "1" and "2") is set in the attribute data 213c, the virtual access interface control unit 23 according to this embodiment selects either the signaling channel "1" or "2" according to the order of priority of the signaling channels "1" and "2" and uses it. When the "load distribution type" (an identical priority of the signaling channels "1" and "2") is set, the virtual access interface control unit 23 selects both of the signaling channels "1" and "2" and uses them. When both of the signaling channels "1" and "2" are used, different call references are set to respective SETUP signals to be transmitted to the ATM switch 1 over each of the signaling channels "1" and "2".

Therefore, the HDT 2 can certainly make the signaling channels redundant and distribute a load on the signaling channel between the HDT 2 and the ATM switch 1. It is therefore possible to improve reliability of the SVC connecting service or provide the SVC connecting service with less delay by distributing a load on a signaling channel. It is also possible to avoid a phenomenon that setup requests having the same call reference are transmitted to the ATM switch 1 in the virtual access interface 5 so that the ATM switch 1 cannot identify the SETUP signals, thus cannot set a virtual connection, whereby load-distribution of signaling channels is realized.

Each of the signal processing units 24 converts a protocol of the signaling message to a form adaptable to its own side (HDT 2) or the side of the ATM switch 1. The ATM cell switching mechanism 25 performs a routing process on an inputted cell according to a setting (data of the connection correspondence table 212) given through the switching process unit 22, and outputs the inputted cell to a predetermined port, thereby establishing an ATM cell communication using VP/VC to which a virtual connection is set. Namely, the ATM switching mechanism 25 functions, together with the above switching process unit 22, as a connecting process unit for performing a connecting process between a virtual path to which a virtual connection is set by the ATM switch 1 and a subscriber terminal 2-$i$.

Figure 10:
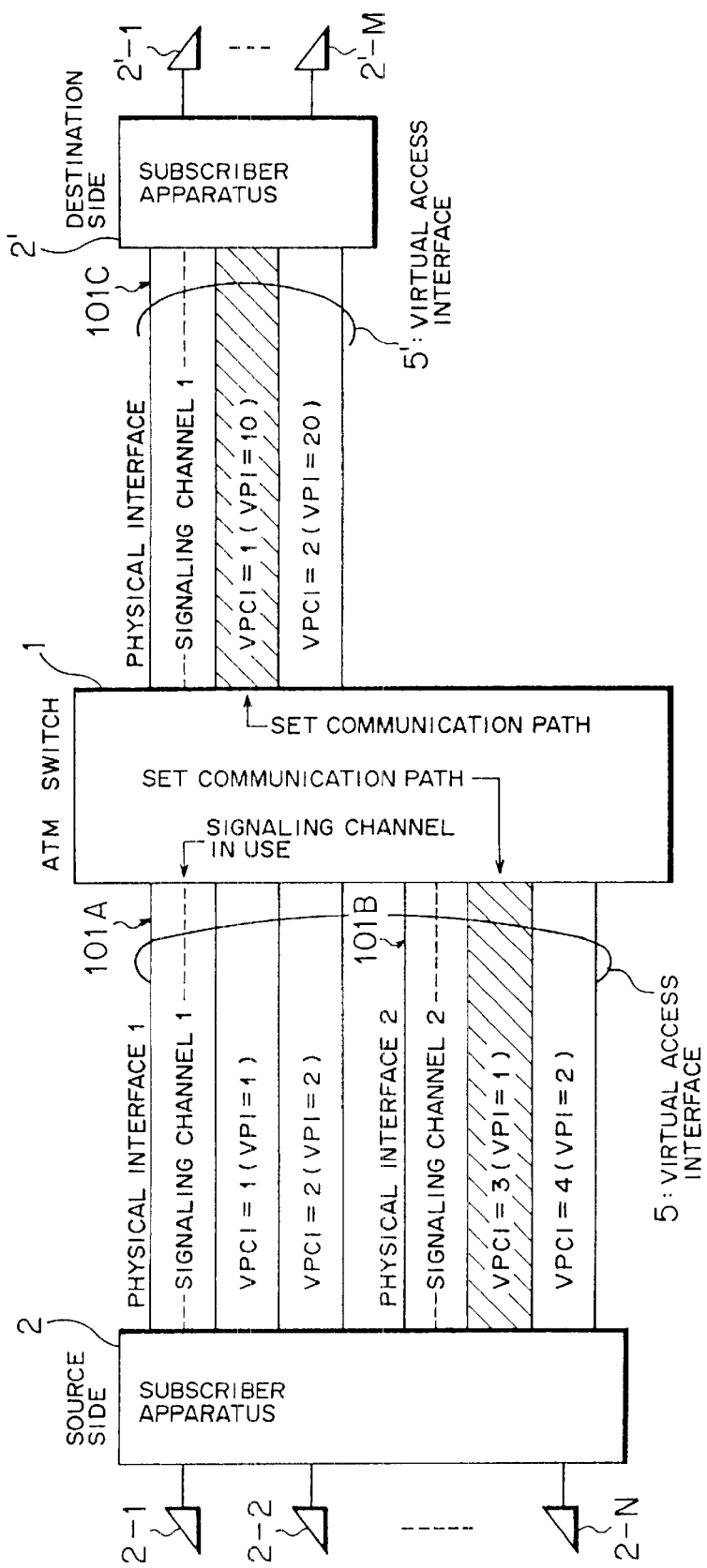
FIG. 10 is a schematic diagram for illustrating an operation of the ATM switching system according to the embodiment.

The HDT 2' has a structure similar to that of the above HDT 2. In this embodiment, the interface apparatus 101C is assumed to be a virtual access interface 5', in which a signaling channel "1" VPCI=1 (VPI=10) and VPCI=2 (VPI=20) is allocated by a setting on the side of the ATM switch 1 (that is, the ATM switch 1 has various data as shown in FIG. 4 in relation to the virtual access interface 5'), as schematically shown in FIG. 10, for example, for the sake of convenience.

Now, description will be made of an operation of the ATM switching system according to this embodiment with the above structure.

Figure 11:
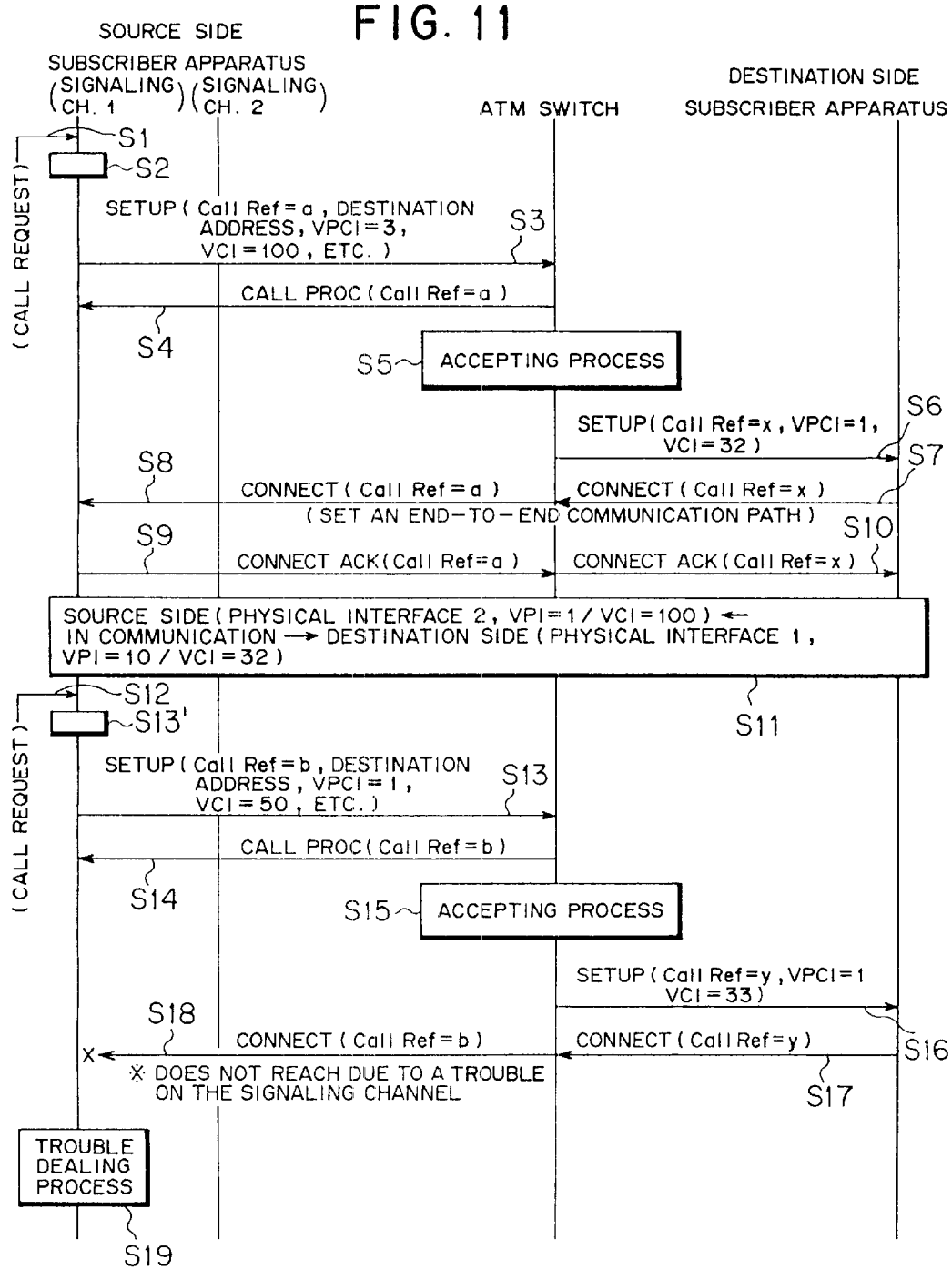
FIG. 11 is a sequence diagram for illustrating an operation of the ATM switching system according to the embodiment.

As shown in FIG. 11, when the HDT 2 receives a call request from a subscriber terminal 2-$i$ to another subscriber terminal 2'-$j$ (j=1 through M) (Step S1), the HDT 2 performs an editing process for a signaling message (SETUP signal) as follows (Step S2).

Figure 14:
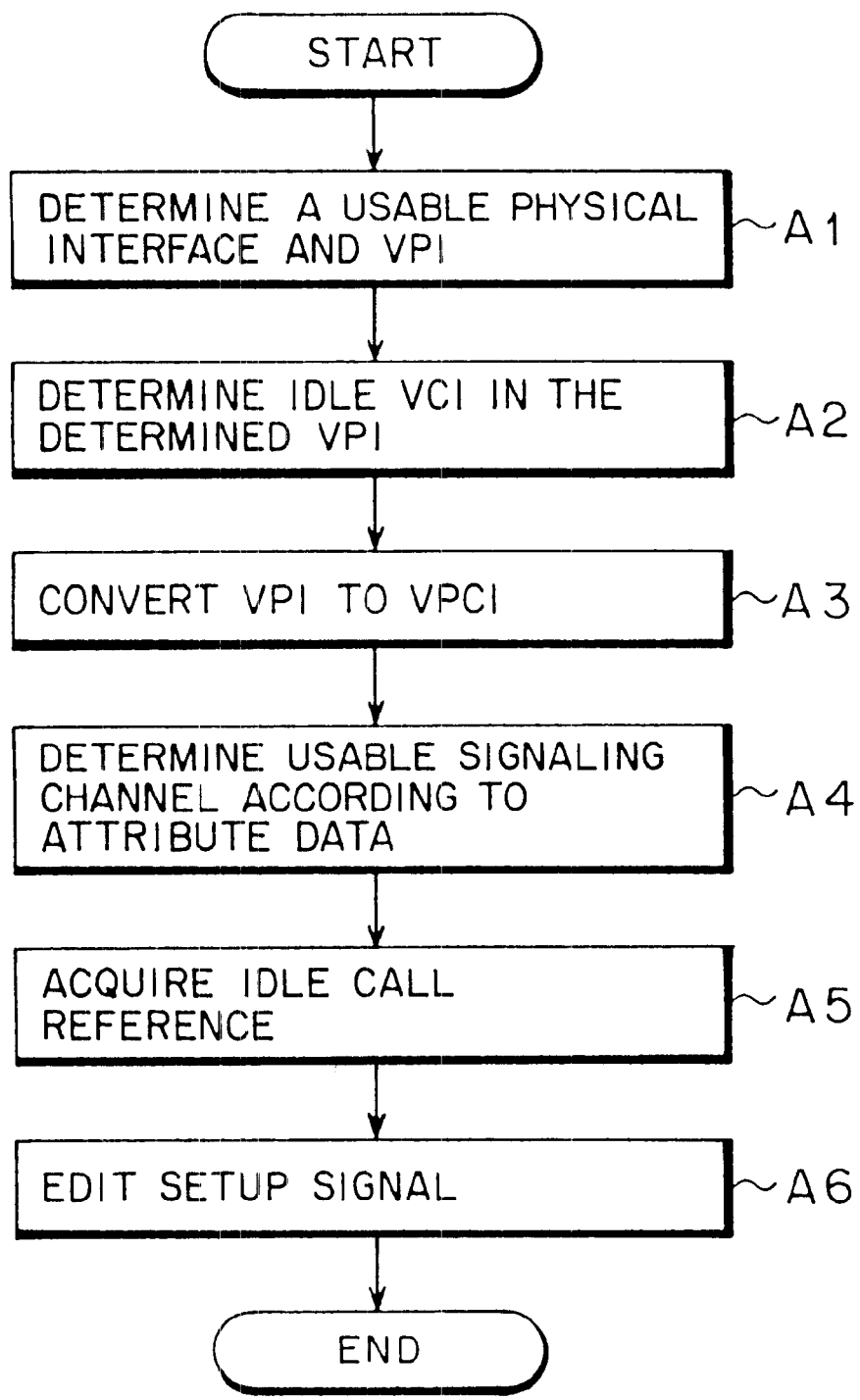
FIG. 14 is a flowchart for illustrating the operation of the ATM switching system according to the embodiment.

Namely, as shown in FIG. 14, the virtual access interface control unit 23 determines a usable physical interface number (in which an idle band exists) ("2", for example) and VP (VPI value: "1", for example) on the basis of the connection correspondence table 212 and the virtual access channel management data group 213 (Step A1).

The virtual access interface control unit 23 determines idle VC (VCI value: "100", for example) in the determined VP (Step A2), and converts the above VPI value (="1") into a VPCI value (="3") on the basis of the VPCI correspondence table 211 (Step A3).

Further, the virtual access interface control unit 23 determines a signaling channel to be used according to the attribute data 213c ("standby configuration type" or "load distribution type") of the virtual access channel management data group 213 (a signaling channel "1" in the case of the "standby configuration type", for example) (Step A4), and acquires an idle call reference ("a", for example) (Step A5), and edits a SETUP signal to which a destination address (called party number), the VPCI value (=3), the VCI value (=100) and the like are attached along with the acquired call reference (=a) (Step A6). The above physical interface number, the VPI value and the VCI value determined at this time are registered in the connection correspondence table 212 (refer to FIG. 9).

The SETUP signal edited as above is protocol-converted into a protocol adaptable to the side of the ATM switch 1 by the signal processing unit 24, then sent to the ATM switch 1 over the signaling channel "1", as shown in FIG. 11 (Step S3). When the signaling message transmitting-receiving unit 32 receives the SETUP signal, the ATM switch 1 sends back a signaling message (CALL PROC) representing that a call accepting process on the SETUP signal having a call reference "a" is now performed to the HDT 2 (Step S4), while performing the following call accepting process (Step S5).

Figure 15:
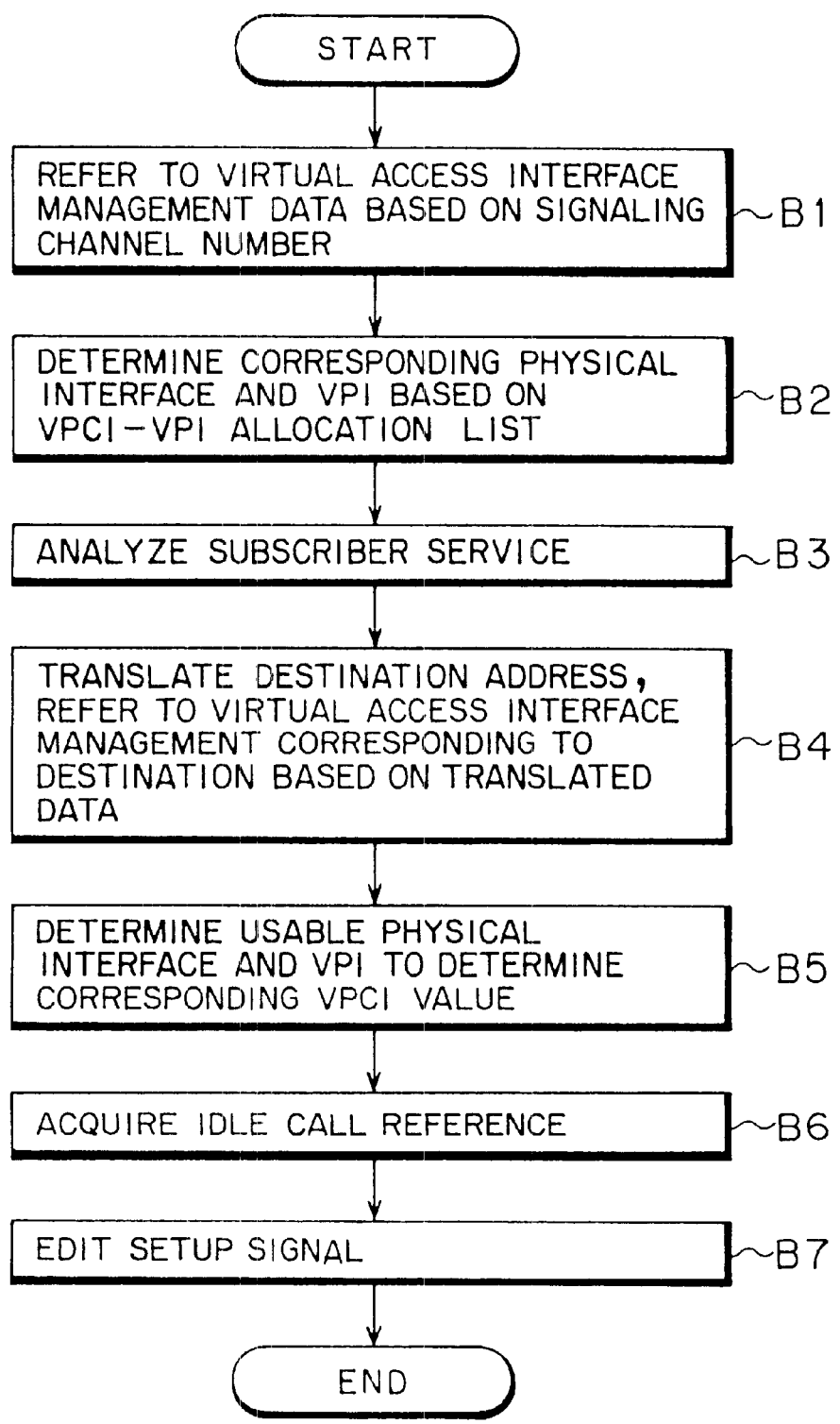
FIG. 15 is a flowchart for illustrating the operation of the ATM switching system according to the embodiment.

As shown in FIG. 15, the virtual access channel managing unit 34 of the switching process unit 34 refers to the signaling channel data 41a in the main storage apparatus 4 with the signaling channel number "1" over which the SETUP signal is received as a key (starting from ① in FIG. 4) to refer to the virtual access interface management data 41b linked to the corresponding signaling channel data 411 (Step B1).

The virtual access channel managing unit 34 refers to the VPCI-VPI allocation list 417 in the virtual access interface management data 41b with the VPCI value (=3) set in the received SETUP signal as a key to determine a physical interface number (=2) and a VPI value (=1) corresponding to the received CPCI value (=3) (Step B2).

When no VPCI value is set in the received SETUP signal, the VPCI selection managing unit 34e automatically acquires an idle VPCI value to determine a physical interface number and a VPI value corresponding thereto.

At this time, in the switching process unit 34, the subscriber service analyzing unit 34b analyzes the subscriber service (for instance, when the subscriber terminals 2-$i$ and 2-$j$ are subscribers of "source number notifying service", a calling party number set in the received SETUP signal is notified to the destination terminal 2-$j$) (Step B3), besides the number translating unit 34c refers to the translation data 41d with a called party number set in the received SETUP signal (starting from ② in FIG. 4) to determine corresponding subscriber data 41c, and determines a number of the virtual access interface management data 41c (that is, management data relating to the virtual access interface 5') linked to the subscriber data 41c (Step B4).

The obtained number is handed to the virtual access channel managing unit 34a. The virtual access channel managing unit 34a refers to the virtual access interface management data 41c corresponding to the number to determine a usable physical interface number (in which an idle band exists) ("1", for example) and a VPI value ("10", for example), and determines a corresponding VPCI value ("1", for example) (Step B5).

Further, the virtual access channel managing unit 34a determines an idle VCI value ("32", for example) for the above VPI value (=10) (Step B6), determines an idle call reference ("x", for example) (Step B6), edits a SETUP signal in which the call reference (=x), the VPCI value (=1) and the VCI value (=32) are set (Step B7), and sends the edited SETUP signal to the HDT 2' on the destination's side over the signaling channel "1" in the virtual access interface 5' (Step S6).

When the HDT 2' receives a response (CONNECT signal) to the SETUP signal (call reference=x) (Step S7), the ATM switch 1 transmits a CONNECT signal (call reference=a) to the HDT 2 over the signaling channel "1" (Step S8), whereby an apparatus address of the destination and the VPI/VCI of the opposite apparatus are set in each of the interface apparatus 101A and 101C on the source-destination communication route so that an end-to-end communication route is set.

In the HDT 2, the switching process unit 22 gives data registered in the connection correspondence table 212 to the ATM cell switching mechanism 25 when the HDT 2 receives the above CONNECT signal (call reference=a), thereby establishing a status where the ATM cell communication is possible, and sends back a response (CONNECT ACK signal) to the received CONNECT signal (call reference=a) to the ATM switch 1 (Step S9).

When receiving the CONNECT ACK signal (call reference=a), the ATM switch 1 sends a CONNECT ACK signal (call reference=x) to the HDT 2' (Step S10). Through the above process, a communication using the physical interface number "2", the VPI=1, and VPCI=100 is started between the HDT 2 (subscriber terminal 2-$i$) on the source's side and the ATM switch 1, whereas a communication using the physical interface number "1", the VPI=10 and the VCI=32 is started between the ATM switch 1 and the HDT 2' (subscriber terminal 2'-$j$) on the destination's side (Step S11: refer to shaded portions in FIG. 10).

Namely, the ATM switch 1 acquires VP on the physical line 8 (physical interface number "2") different from the physical line 8 (physical interface number "1") to which the signaling channel "1", over which the SETUP signal is transmitted from the HD 2, belongs, as VP for the received SETUP signal, in this case.

When another subscriber terminal 2-$i$, for example, makes a new call request in this state and the HDT 2 receives it (Step S12), the virtual access interface control unit 23 of the HDT 2 performs an editing process similar to the above editing process (Steps A1 through A6 in FIG. 14) for a SETUP signal (call reference=b, destination address, VPCI value=1, and VCI value=50) (Step S13'), and transmits the edited SETUP signal to the ATM switch 1 (Step S13).

When the ATM switch 1 receives the SETUP signal, the switching process unit 34 edits a signaling message (CALL PROC) representing that an accepting process on a call for the SETUP signal (call reference=b) is being performed and sends it back to the HDT 2 (Step S14), and performs a call accepting process (refer to Steps B1 through B7 in FIG. 15) on the received SETUP signal (call reference=b).

Namely, the switching process unit 34 determines a physical interface number ("1", for example), a VPI value ("10", for example), a VCI value ("32", for example), a VPCI value ("1", for example), a call reference ("y", for example) and the like used between the ATM switch 1 and the HDT 2' on the destination's side, and edits a SETUP signal in which the call reference (=y), the VPI value (=10) and the VCI value (=33) are set (Step S15).

The edited SETUP signal is transmitted to the HDT 2' over the signaling channel "1" in the virtual access interface 5' (Step S16). After that, when the ATM switch 1 receives a response (CONNECT signal) to the above SETUP signal from the HDT 2' (Step S17), the ATM switch 1 transmits a CONNECT signal (call reference=b) over the signaling channel "1" to the HDT 2 (Step S18) to try to set an end-to-end communication route. Assuming here that, at this time, the signaling channel "1" becomes unusable due to a trouble or something and the above CONNECT signal (call reference=b) does not reach the HDT 2, for example.

Figure 16:
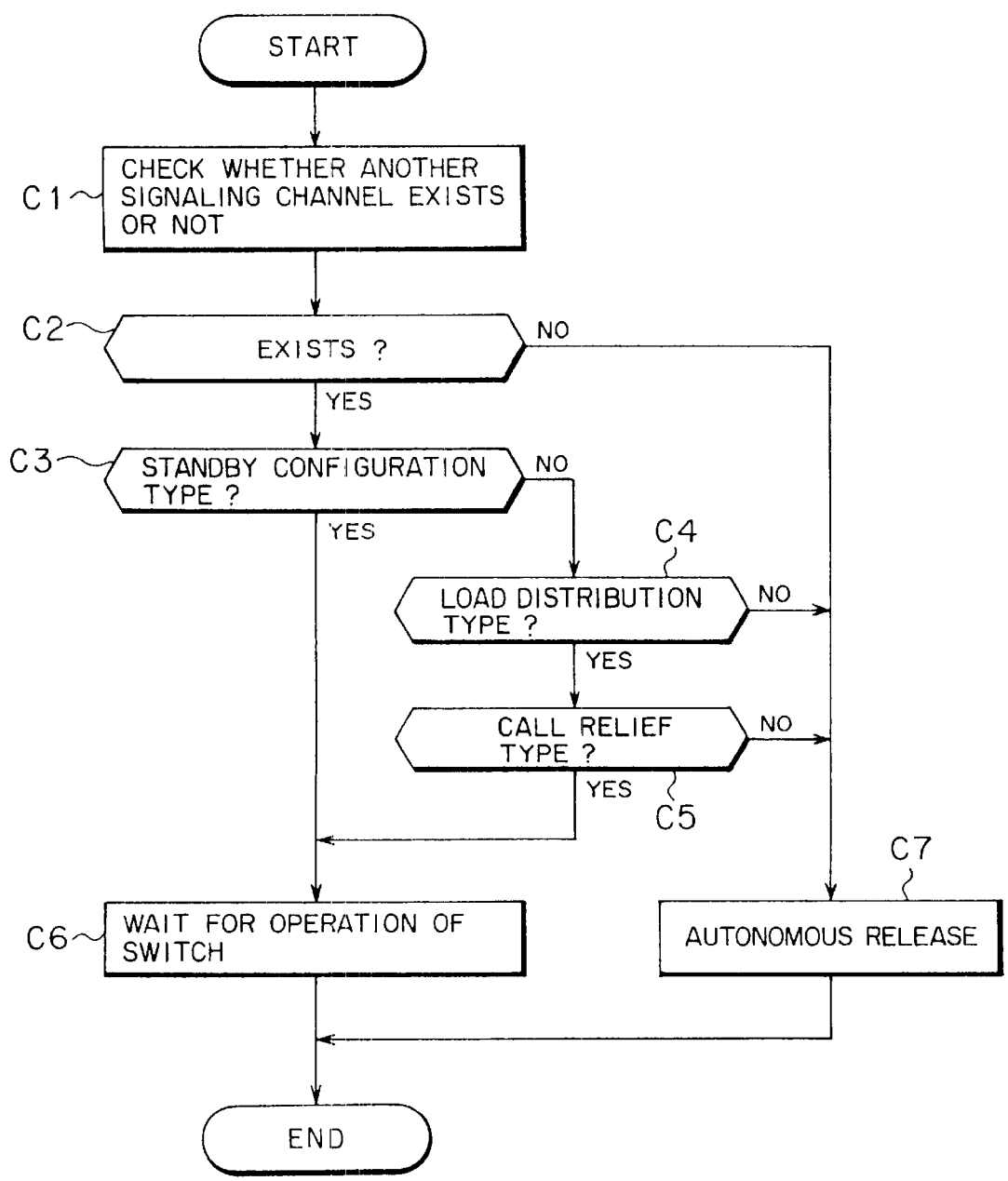
FIG. 16 is a flowchart for illustrating the operation of the ATM switching system according to the embodiment.

In this case, the HDT 2 performs the following trouble dealing process when detecting the trouble in the signaling channel "1" (detection of disconnect of an inputted optical signal or the like) (Step S19). Namely, as shown in FIG. 16, the virtual access interface control unit 23 refers to the virtual access channel management data group 213 in the storing unit 21, and examines whether the signaling channel data 213b relating to a signaling channel (signaling channel "2" in this case) other than the signaling channel "1" exists or not (Steps C1 and C2).

If another signaling channel data 213b exists, as a result (if judged YES at Step C2), the virtual access interface control unit 23 further refers to the attribute data 213c of the virtual access channel management data group 213 to examine either the "standby configuration type" or the "load distribution type" is set (Steps C3 and C4).

Since the "standby configuration type" is set in the attribute data 213c as described above, the virtual access channel control unit 23 gets into a status where the virtual access channel control unit 23 waits for an operation of the side of the ATM switch 1 (from YES route at Step C3 to Step C6). As will be described later, if the "load distribution type" is set in the attribute data 213c, the virtual access channel control unit 23 further examines either the "call relief type" or the "non-relief type" is set (from NO route at Steps C3 and C4 to Step C5). If the "call relief type" is set, the virtual access channel control unit 23 gets into a status where the virtual access channel control unit 23 waits for an operation of the side of the ATM switch 1, similarly to the case of the "standby configuration type" (from YES route at Step C5 to Step C6). If the "non-relief type" is set, the virtual access channel control unit 23 abandons transmission-reception of a signaling message, and autonomously releases a connection with the ATM switch 1 (from NO route at Step C5 to Step C7). If neither the "standby configuration type" nor the "load sharing type" is set, the virtual access interface control unit 23 autonomously releases a connection with the ATM switch 1, as well (from NO route at Step C4 to Step C7).

Figure 12:
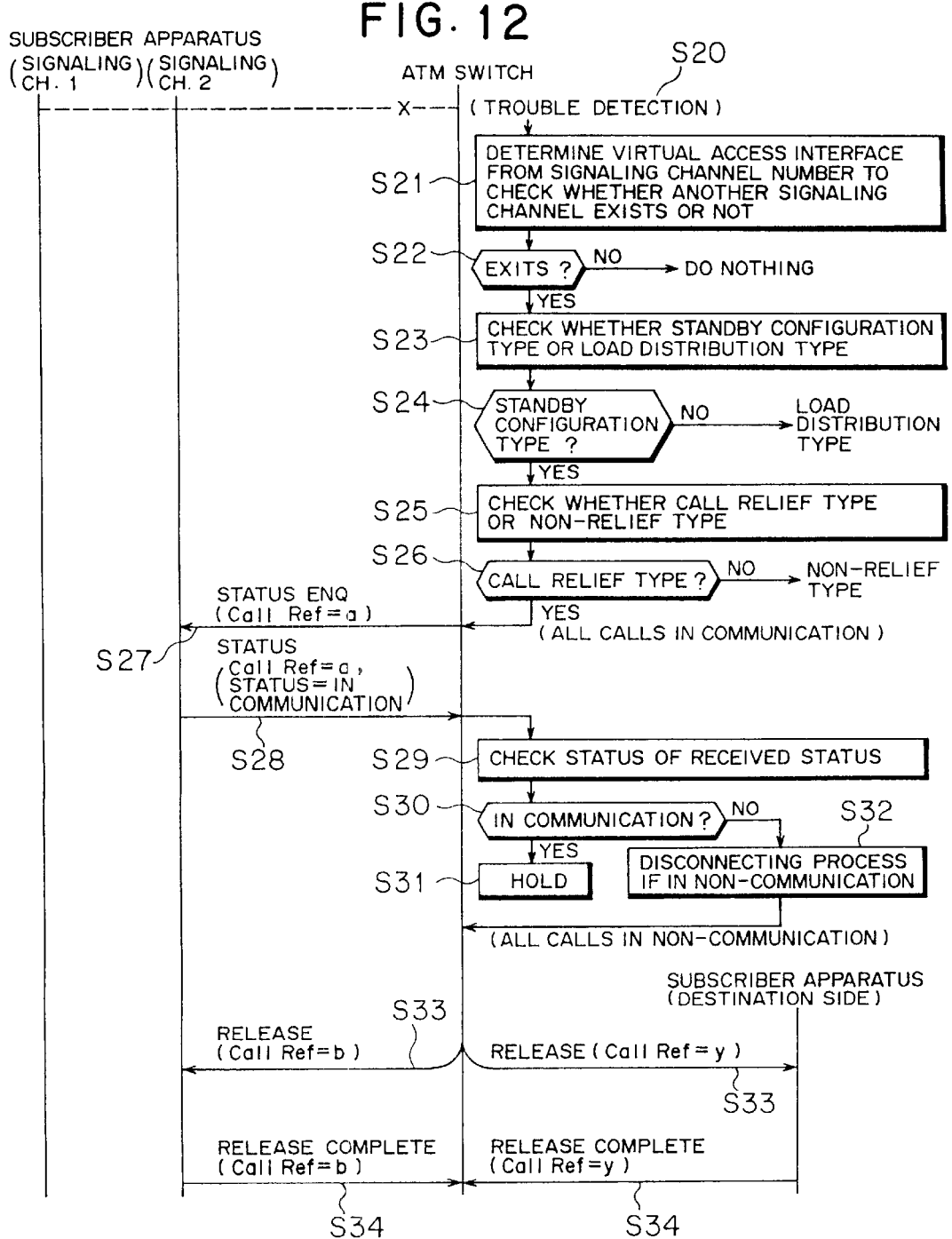
FIG. 12 is a sequence diagram for illustrating the operation of the ATM switching system according to the embodiment.

On the other hand, when a trouble in the above signaling channel "1" is detected in the ATM switch 1 (Step S20), as shown in FIG. 12, the virtual access channel managing unit 34a of the switching process unit 34 refers to the signaling channel management data 41a and the virtual access interface management data 41b in the service data managing unit 41 with a signaling channel number at which the trouble occurs as a key, and examines whether a signaling channel (signaling channel "2", in this case) other than the signaling channel "1" in which the trouble occurs exists or not (whether the pointer 415 exists or not) (Step S21).

If the signaling channel "2" exists as a result (if judged YES at Step S22), the virtual access channel management unit 34a further refers to the attribute data 418 in the virtual access interface management data 41b, and examines either the "standby configuration type" or the "load distribution type" is set (Step S23). If another signaling channel "2" does not exist, the virtual access channel managing unit 34a performs no special process (NO route at Step S22).

Since the "standby configuration type" is set at present in the attribute data 418 correspondingly to the side of the HDT 2 (since judged YES at Step S24), the virtual access channel managing unit 34a switches a signaling channel in use to the signaling channel "2", and examines either the "call relief type" or the "non-relief type" is set in the attribute data 418 (Step S25).

If the "call relief type" is set as a result, the virtual access channel managing unit 34a inquires of the HDT 2 over the signaling channel "2" status of all calls (call references) recognized as being in communication at present on the side of the ATM switch 1 (transmits of a STATUS ENQ signal) (from YES route at Step S26 to Step S27).

When receiving the above status inquiry from the ATM switch 1, the HDT 2 examines "communication status" (in communication/non-communication) of a relevant call reference, and notifies a result of the ATM switch 1 by means of a STATUS signal over the signaling channel "2" (Step S28).

When the ATM switch 1 receives the above STATUS signal from the HDT 2, the switching process unit 34 (virtual access channel managing unit 34a) examines "communication status" of the call reference notified by means of the STATUS signal (Step S29). If the "communication status" of the call reference is "in communication" (status coincidence), the ATM switch 1 continues a control (the following call disconnecting process and the like) on the call in communication (virtual connection having been set) by continuously using the signaling channel "2", thereby relieving the call (from YES route at Step S30 to Step S31).

If the above "communication status" is "in non-communication" (status non-coincidence), the virtual access channel managing unit 34a transmits a disconnect signal (RELEASE signal) for the relevant call reference to the HDTs 2 over the signaling channel "2", as well as the HDT 2', thereby performing a disconnecting process on all calls whose status is in non-coincidence (Steps S32 and S33). The call disconnecting is completed when a response (RELEASE COMPLETE signal) to the above RELEASE signal is received by the ATM switch 1 (Step S34).

The ATM switch 1 uses a current channel "1" in a normal state. In an emergency where a trouble occurs in the current channel "1" and the current channel "1" becomes unusable, the ATM switch 1 switches a channel in use to a standby channel "2", so that the SVC connecting service is not unusable for a long time. It is therefore possible to remarkably improve reliability of the SVC connecting service. In concrete, if the "call relief type" is set in the attribute data 418 in this case, the ATM switch 1 continuously controls a virtual connection in communication over the signaling channel "2" having been switched to. It is thereby possible to avoid a condition in which disconnecting of a communication cannot be normally done.

Figure 13:
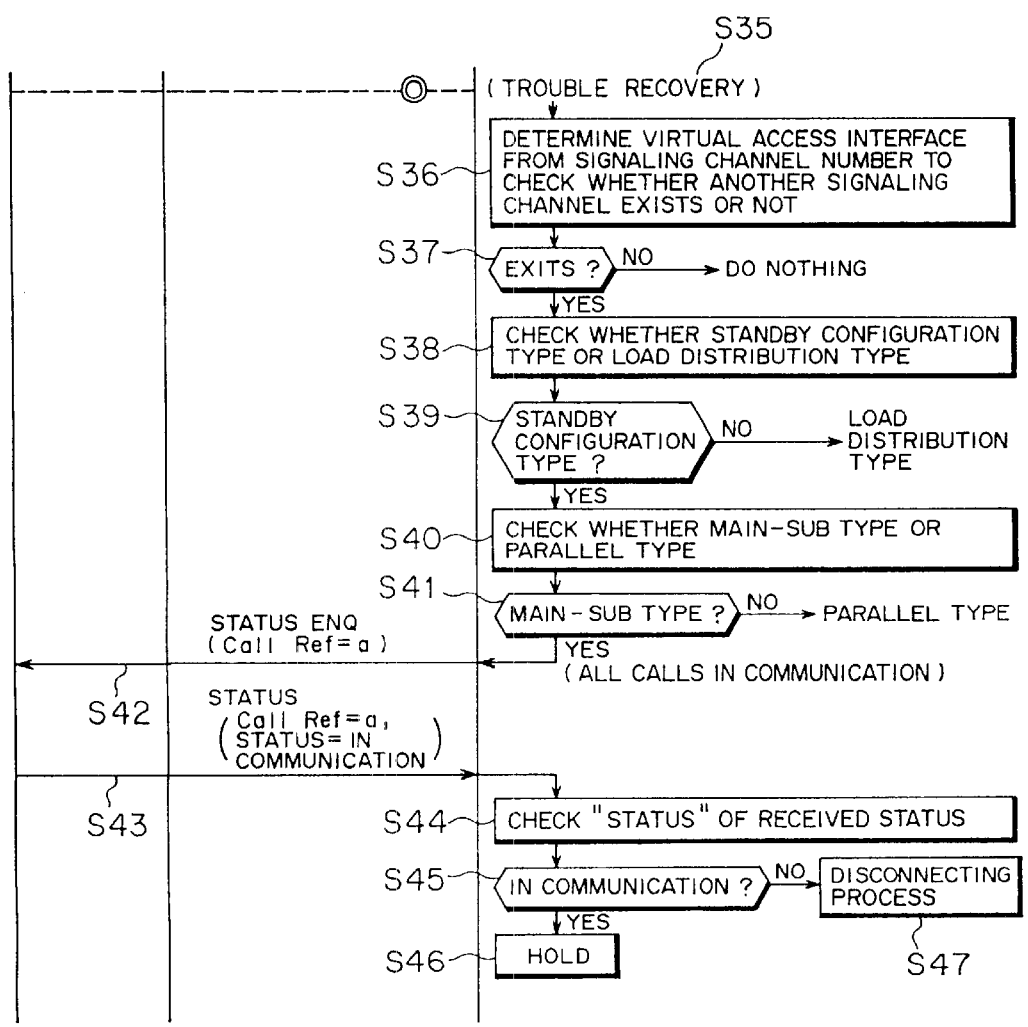
FIG. 13 is a sequence diagram for illustrating the operation of the ATM switching system according to the embodiment.

When the trouble in the signaling channel "1" is recovered and the signaling channel "1" becomes usable after the occurrence of the trouble, as shown in FIG. 13, for example, (Step S35), the virtual access channel managing unit 34a in the ATM switch 1 refers to the virtual access interface management data 41b of the service data managing unit 41 with a number of a signaling channel on which the trouble is recovered as a key, and examines whether another signaling channel "2" (pointer 415) exists or not (Step S36). The above trouble recovery can be detected in a process such as confirmation on an input of an optical signal, continuity confirmation on the signaling channel "1" performed periodically in AAL (ATM Adaptation Layer) or the like.

If the signaling channel "2" does not exist, the virtual access channel managing unit 34a performs no special process (NO route at Step S37). Since the signaling channel "2", however, exists here (since judged YES at Step S37), the virtual access channel managing unit 34a further refers to the attribute data 418, and examines either the "standby configuration type" or the "load distribution type" is set (Step S38).

Since the "standby configuration type" is now, of course, set in the attribute data 418 (since judged YES at Step S39), the virtual access channel managing unit 34a next examines either the "main-sub type" or the "parallel type" is set in the attribute data 418 (Step S40). If the "main-sub type" is set, the virtual access channel managing unit 34a switches a signaling channel in use to the previous signaling channel in a higher priority (current channel) "1" (selects the signaling channel "1").

As above, the ATM switch 1 switches a signaling channel in use to the current channel "1" after a trouble is recovered if the "main-sub type" is set in the attribute data 418. Namely, the ATM switch 1 uses the current channel "1" as long as the current channel "1" is usable. It is therefore possible to readily manage a signaling channel in use.

Further, the virtual access channel managing unit 34a inquires of the HDT 2 over the current channel "1" a status, similarly to the above (transmits the STATUS ENQ signal) (from YES route at Step S41 to Step S42). When receiving a STATUS signal as a response to the inquiry from the HDT 2 (Step S43), the virtual access channel managing unit 34a examines "communication status" of a call notified by means of the received STATUS signal (Step S44).

With respect to a call whose "communication status" is "in communication" (status coincidence), the virtual access channel managing unit 34a continues a control on the call (call reference=a, for example) in communication by continuously using the current channel "1", thereby relieving the call (from YES route at Step S45 to Step S46). With respect to a call whose "communication status" is "in non-communication" (status non-coincidence), the virtual access channel managing unit 34a transmits a disconnect signal (RELEASE signal) over the current channel "1", thereby disconnecting it (from NO route at Step S45 to Step S47).

Figure 17:
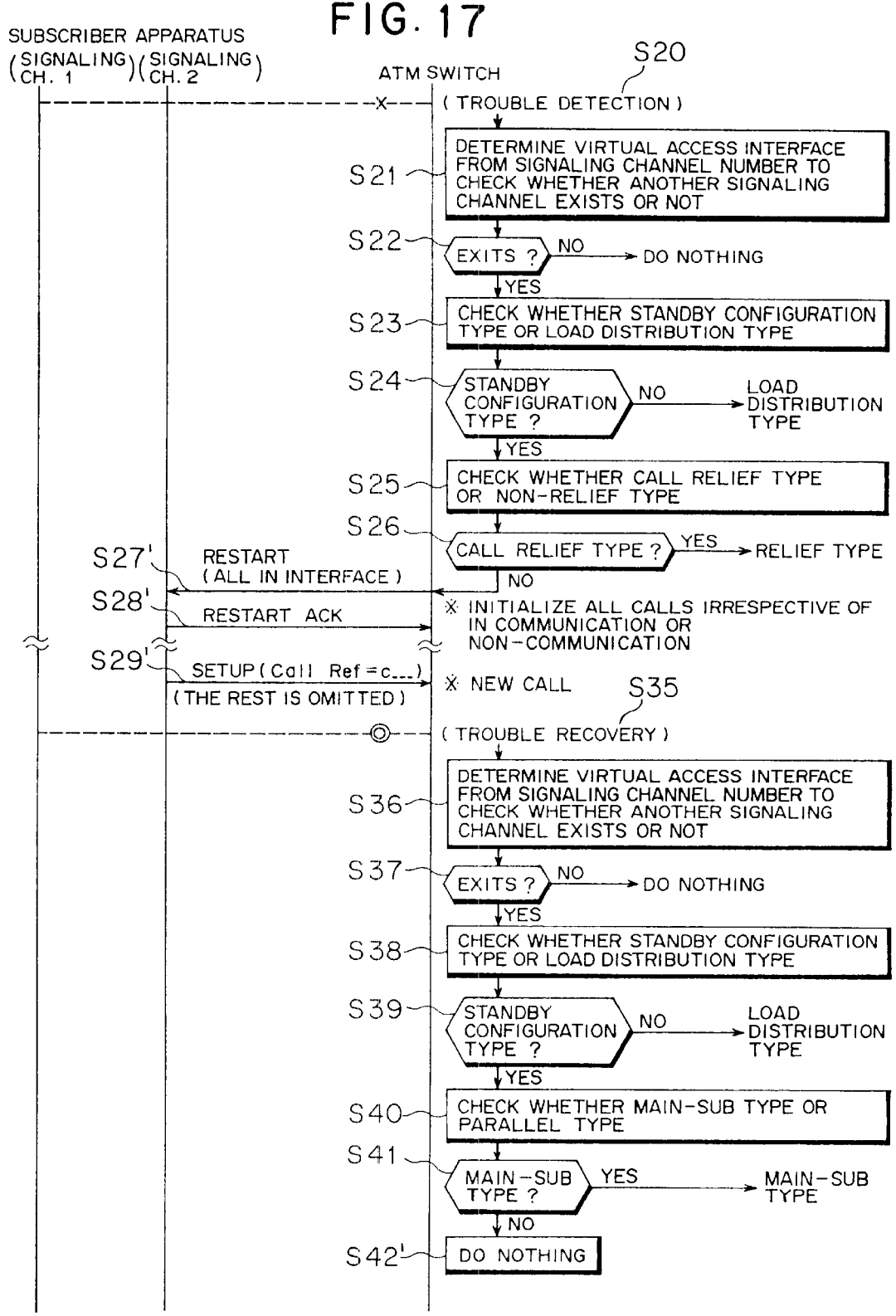
FIG. 17 is a sequence diagram for illustrating another operation of the ATM switching system according to the embodiment.

If the "non-relief type" is set in the attribute data 418 at the above Step S26, the virtual access channel managing unit 34a, as shown in FIG. 17, transmits a RESTART signal over a signaling channel (standby channel) "2" after switching, thereby simultaneously releasing all calls irrespectively of their "communication status" (in communication/non-communication) (initializes the control of setting a virtual connection to a virtual path: from NO route at Step S26 to Step S27').

The status non-coincidence in the setting control that possible occurs between the ATM switch 1 and the HDT 2 during a switching between the signaling channels "1" and "2" is thereby solved within a short time. Incidentally, the initialization is completed when a response (RESTART ACK signal) to the above RESTART signal is received by the ATM switch 1 (Step S28').

If the "parallel type" is set in the attribute data 418 at the above Step S40, no switching between the signaling channels "1" and "2" is conducted. Accordingly, the virtual access channel managing unit 34a continuously uses the standby channel "2" after the switching (from NO route at Step S41 to Step S42').

In this case, it is possible to prevent a signaling channel in use from being frequently switched because of repetitive occurrence/recovery of troubles within a short time, thus stabilize the SVC connecting service.

Next, description will be made of an operation in the case where the "load distribution type" is set in the attribute data 418 and 213c in the ATM switch 1 and the HDT 2, referring to a sequence diagram shown in FIG. 18.

When a call request is transmitted from a subscriber terminal 2-i (subscriber terminal 2-1, for example), the virtual access interface control unit 23 in the HDT 2 performs a process similar to the editing process (Steps A1 through A6) shown in FIG. 14 to determine a signaling channel to be used, while performing the editing process for a SETUP signal.

Since the "load distribution type" is here set in the attribute data 213c, the virtual access interface control unit 23 arbitrarily selects and determines an idle signaling channel (signaling channel "1", for example) by referring to the signaling channel data 213a and 213b, acquires an idle call reference ("1", for example) by referring to the call reference management data 213, and edits a SETUP signal (call reference=1).

The virtual access interface control unit 23 transmits the edited SETUP signal to the ATM switch 1 over the signaling channel "1" (Step S51).

When the ATM switch 1 receives the above SETUP signal over the signaling channel "1", the switching process unit 34 (virtual access channel managing unit 34a) sends back a CALL PROC signal (call reference=1) to the HDT 2 to perform the call accepting process on the received SETUP signal (call reference=1), while referring to the call reference management data 41e [refer to FIG. 5(b)] with a signaling channel number as a key to update relevant signaling message management data 41f (sets "SETUP signal reception status" and the like).

After that, the ATM switch 1 transmits a CONNECT signal to the HDT 2 over the signaling channel "1" (Step S52). When the ATM switch 1 receives a response (CONNECT ACK signal) to the CONNECT signal, a communication route (virtual connection) for a call of the call reference=1 is established and a communication is commenced.

When the HDT 2 receives a call request from a subscriber terminal 2-i (subscriber terminal 2-2, for example) other than the above subscriber terminal 2-1, the HDT 2 performs a process similar to the editing process (Steps A1 through A6) shown in FIG. 14 in this case to determine a signaling channel to be used while performing the editing process for a SETUP signal. However, since the signaling channel 1 is now in use, the virtual access interface control unit 23 selects another signaling channel "2", acquires an idle call reference ("2", for example) by referring to the call reference management data 214, and edits the SETUP signal (call reference=2). As a result, call references of signaling messages exchanged over the signaling channels "1" and "2", are such allocated that the call references are not duplicated in the virtual access interface 5.

The edited SETUP signal (call reference=2) is transmitted to the ATM switch 1 over the signaling channel "2" (Step S53). In this case, a CONNECT signal (call reference=2) is transmitted to the HDT 2 from the ATM switch 1 over the signaling channel "2" after relevant signaling message management data 41*f* is updated (Step S54), and a communication route (virtual connection) for the call reference=2 is established when a response (CONNECT ACK signal) to the CONNECT signal is received by the ATM switch 1, and a communication is commenced.

Namely, the ATM switch 1 selects two signaling channels "1" and "2" when the "load distribution type" is set in the attribute data 418, and controls setting of different virtual connections over the signaling channels "1" and "2". Accordingly, loads on the signaling channel "1" and "2" are distributed. It is therefore possible to carry out the SVC connecting service quickly, and provide a connecting service with less delay.

In this case, by allocating different call references to signaling messages exchanged over the signaling channel "1", it is possible to avoid a phenomenon that the ATM switch 1 accepts SETUP signals having the same call reference in the virtual access interface 5, cannot identify them, thus cannot set virtual connections. This embodiment can thereby certainly realize load distribution of signaling channels.

Next, assuming here that when the signaling channels "1" and "2" are separately used, a trouble occurs in, for example, the signaling channel "1" and the signaling channel "1" thus becomes unusable. In this case, when the HDT 2 detects the trouble, the virtual access interface control unit 23 judges that the "load distribution type" is set in the attribute data 213*c* at the Step C4 described before with reference to FIG. 16, further examines either the "call relief type" or the "non-relief type" is set in the attribute data 213*c* (from YES route at Step C4 to Step C5).

If the "call relief type" is set at present, for example, the virtual access interface control unit 23 gets into a state where the virtual access interface control unit 23 waits for an operation of the ATM switching 1 (from YES route at Step C5 to Step C6).

Figure 18:
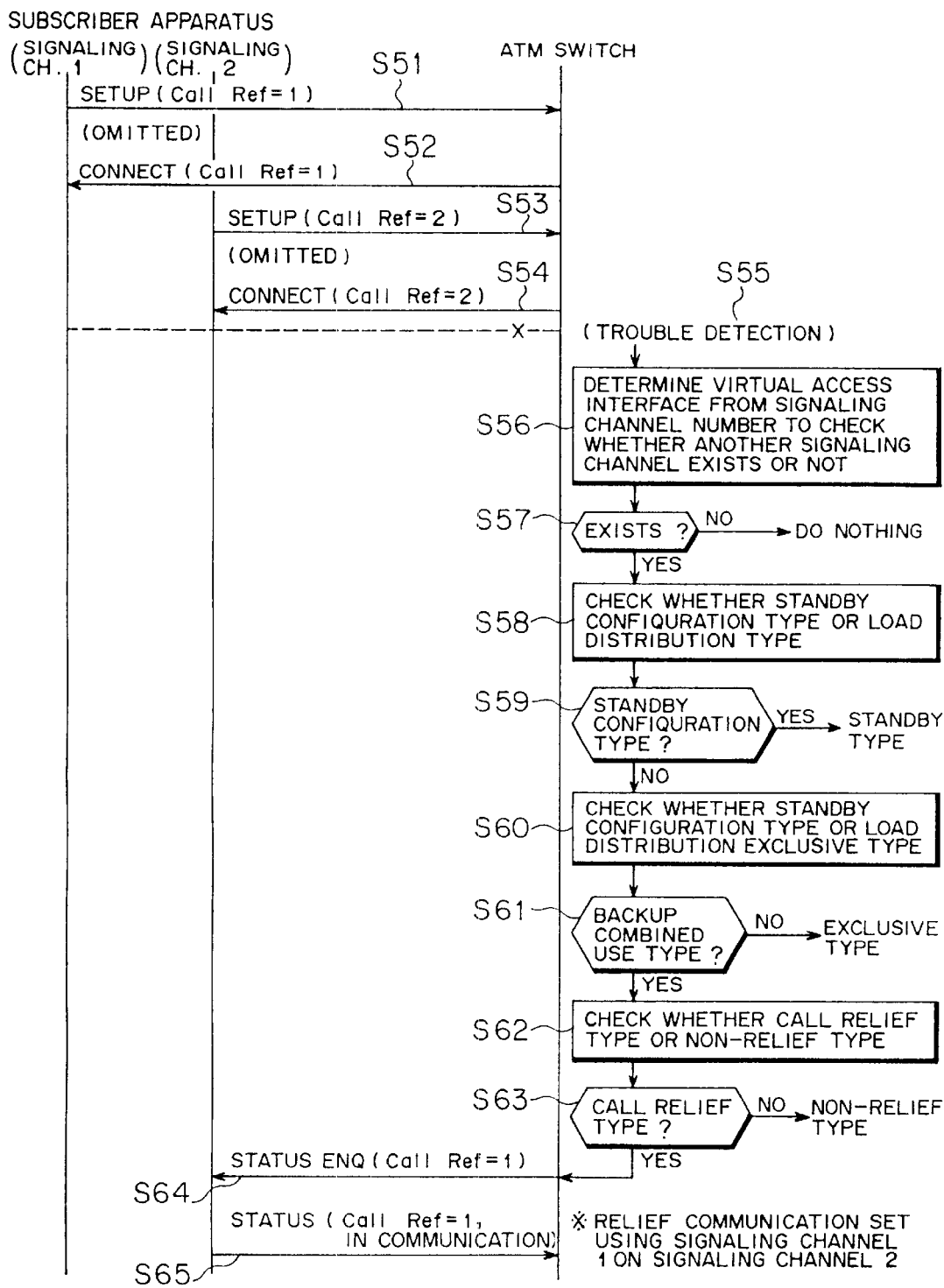
FIG. 18 is a sequence diagram for illustrating still another operation of the ATM switching system according to the embodiment.

When the ATM switch 1 detects the above trouble in the signaling channel "1", as shown in FIG. 18 (Step S55), the virtual access channel managing unit 34*a* of the switching process unit 34 refers to the signaling channel management data 41*a* and the virtual access interface management data 41*b* in the service data managing unit 41 with a number of a signaling channel on which the trouble occurs as a key to examine whether there is another signaling channel (signaling channel "2", in this case) other than the signaling channel "1" on which the trouble occurs (whether there is the pointer 416) (Step S56).

If the signaling channel "2" exists as a result (if judged YES at Step S57), the virtual access channel managing unit 34*a* further refers to the attribute data 418 in the virtual access interface management data 41*b* to examine either the "standby configuration type" or the "load distribution type" is set (Step S58). If no other signaling channel "2" exists, the virtual access channel managing unit 34*a* performs no special process (NO route at Step S57).

Since the "load distribution type" is set at present in the attribute data 418 (since judged YES at Step S59), the virtual access channel managing unit 34*a* examines either the "load distribution exclusive type" or the "backup combined use type" is set in the attribute data 418 (Step S60). If the "backup combined use type" is set as a result, the virtual access channel managing unit 34*a* further examines either the "call relief type" or the "non-relief type" is set in the attribute data 418 (from YES route at Step S61 to Step S62).

If the "call relief type" is set, for example, the virtual access channel managing unit 34*a* decides to conduct a call control, using the signaling channel "2", on a virtual connection having been set [a call in communication (call reference=1)] using the signaling channel "1" (namely, the signaling channel "2" can be used for the call control on calls of call references=1 and 2), and inquires of the HDT 2 over the signaling channel "2" status (transmits STATUS ENQ signal) of all calls (call references) that the ATM switch 1 recognizes that they are in communication at present (from YES route at Step S63 to Step S64).

When receiving the above inquiry from the ATM switch 1, the HDT 2 examines "communication status" (in communication/non-communication) of a relevant call reference, and notifies a result of the examination of the ATM switch 1 by means of a STATUS signal over the signaling channel "2" (Step S65). In the ATM switch 1, the virtual access channel managing unit 34*a* continues the control on only a call (call reference=1) "in communication" (status coincidence) using the signaling channel "2" to relieve the call. Accordingly, a communication established using the signaling channel "1" is relieved by using the signaling channel "2".

Namely, when the "backup combined use type" and the "call relief type" are set in the attribute data 418, the ATM switch 1 of this invention performs the call control (backup control) on a call in communication using a signaling channel "2" other than a signaling channel (a part of the signaling channels) "1" on which a trouble occurs. It is therefore possible to backup a channel on which a trouble occurs while distributing a load on a signaling channel, and to avoid a condition in which a communication cannot be disconnected normally. Accordingly, a delay time in the SVC connecting service is reduced, and reliability thereof is largely improved.

When the "load distribution exclusive type" is set in the attribute data 418 (when judged NO at Step S61), or the "non-relief type" is set (when judged NO at Step S63), the virtual access channel managing unit 34*a* performs no special process (no backup control).

According to this embodiment, two signaling channels are set to the virtual access interface 5, and a VPCI value corresponded to a VPI value one-to-one is such allocated that the VPCI value is unique in the virtual access interface 5, whereby a virtual connection is set to an arbitrary VP in the virtual access interface 5 over an arbitrary signaling channel "1" or "2" (it is possible to acquire VP on the physical line 8 different from the physical line 8 to which a signaling channel, over which an SVC connect request is transmitted, belongs as VP for the SVC connect request). It is therefore possible to make a signaling channel between a subscriber and a network redundant and distribute a load, leading to an improvement of reliability of the SVC connecting service (virtual connection setting control) and a reduce of delay time.

In a large-capacity data communication using a broad band ISDN, for example, it is possible to allow a signaling channel between a large-capacity server providing the service source and the network to be redundant, thus possible to provide an SVC connecting service highly reliable and with less suspend, or an SVC connecting service with less delay by distributing a load on a signaling channel.

Although the above embodiment has been described by way of example where two signaling channels are set in the virtual access interface 5. However, this invention is not limited to the above example. It is alternatively possible to set a plurality of signaling channels not less than three.

In which case, a predetermined order of priority is set to the plural signaling channels by the attribute data 418 and 213*c*, and the ATM switch 1 and the HDT 2 select a signaling channel to be used according to the order of priority, and allocate a signaling channel in a lower priority as a backup. It is thereby possible to make a signaling channel redundant with ease, similarly to the above embodiment.

Alternatively, an identical priority may be set to the above plural signaling channels by the attribute data 418 and 213*c*, and the ATM switch 1 and the HDT 2 may arbitrarily select plural signaling channel and use them. In which case, different SVC connecting controls may be executed using different signaling channels. It is thereby possible to distribute a load on each channel with ease.

Further, the above embodiment has been described by way of example where a region of VP as the virtual access interface 5 is VP in the two physical interfaces 101A and 101B. However, this invention is not limited to the above example. The VP may be in one physical interface, or in three or more physical interfaces.

The present invention is not limited to the above embodiment, but various modifications are possible without departing from the scope of the invention.

What is claimed is:

1. A switching system having a subscriber apparatus accommodating subscriber terminals and a switching apparatus accommodating said subscriber apparatus via one or more physical interface(s) to allocate a plurality of virtual paths to which virtual connections may be set to said physical interface(s) to virtually-handle said physical interface(s) as one single virtual interface, said switching system comprising:

said switching apparatus comprising:
a plural-signaling-channel setting unit for setting a plurality of signaling channels for virtual connection setting control to said virtual interface;
a signaling channel information storing unit for storing signaling channel information on said plural signaling channels;
a virtual interface information storing unit for storing virtual interface information for uniquely identifying a virtual path to which said virtual connection should be set in said virtual interface as information in common to said signaling channel information;
a virtual connection setting control unit for identifying at least a virtual path that is an object of virtual connection setting on the basis of said virtual interface information when receiving a set request for a virtual connection from said subscriber apparatus over an arbitrary signaling channel accommodated by a physical interface of the switching apparatus, and setting the requested virtual connection to a virtual path using the signaling channel over which said set request is received, wherein the set virtual path belongs to another physical interface of the switching apparatus that is different from the physical interface having the signal channel used for the set request;

said subscriber apparatus comprising:
a virtual interface control unit for making a set request for said virtual connection of said switching apparatus over an arbitrary signaling channel; and
a connecting process unit for performing a connecting process between said virtual path to which said virtual connection is set by said switching apparatus and said subscriber terminal.

2. The switching system according to claim 1, wherein said virtual interface information storing unit of said switching apparatus sets different identification information to each virtual connection that may be set in said virtual interface, and stores identification information on said physical interface and identification information on said virtual path correspondingly to said identification information; and said virtual connection setting control unit of said switching apparatus identifies a physical interface and a virtual path to which a virtual connection should be set on the basis of the identification information of said virtual connection required to be set.

3. The switching system according to claim 1, wherein a predetermined order of priority is set to said plural signaling channels, and said virtual interface control unit of said subscriber apparatus and said virtual connection setting control unit of said switching apparatus select a signaling channel to be used according to said order of priority.

4. The switching system according to claim 1, wherein an identical priority is set to said plural signaling channels, and said virtual interface control unit of said subscriber apparatus and said virtual connection setting control unit of said switching apparatus arbitrarily select and use said plural signaling channels.

5. A switching system including a subscriber apparatus accommodating subscriber terminals and a switching apparatus accommodating said subscriber apparatus via one or more physical interface(s) to allocate a plurality of virtual paths to which virtual connections may be set to said physical interface(s) to virtually-handle said physical interface(s) as one single virtual interface, said switching system comprising:

a channel setting unit controlling virtual connection setting of a plurality of signaling channels to said virtual interfaces; and
a virtual connection setting control unit for identifying at least a virtual path that is an object of virtual connection setting on the basis of virtual interface information when receiving a set request for a virtual connection from said subscriber apparatus over a signaling channel accommodated by a physical interface of the switching apparatus, and setting the virtual connection to an arbitrary virtual path in a virtual interface over a signaling channel which belongs to a physical interface that is different from the physical interface accommodating a last previously set virtual path.

6. A subscriber apparatus accommodating subscriber terminals while being accommodated by a switching apparatus via one or more physical interface(s) to allocate a plurality of virtual paths to which virtual connections may be set to said physical interface(s) to virtually-handle said physical interface(s) as one single virtual interface, said subscriber apparatus comprising:

a plurality of signaling channels for virtual connection setting control in said virtual interface are allocated to different physical interface(s);

a virtual interface control unit for making a set request for a virtual connection of said switching apparatus using an arbitrary signaling channel accommodated by a physical interface of the switching apparatus in said virtual interface; and a connecting process unit for performing a connecting process between a virtual path to which a virtual connection is set by said switching apparatus and said subscriber terminal, wherein the set virtual path belongs to another physical interface of the switching apparatus that is different from the physical interface having the signal channel used for the set request.

7. The subscriber apparatus according to claim 6, wherein a predetermined order of priority is set to said plural signaling channels, and said virtual interface control unit selects and uses said plural signaling channels according to said order of priority.

8. The subscriber apparatus according to claim 6, wherein an identical priority is set to said plural signaling channels, and said virtual interface control unit arbitrarily selects and uses said plural signaling channels.

9. The subscriber apparatus according to claim 8, wherein said virtual interface control unit sets different call identification information for each of set requests to be transmitted to said switching apparatus over said plural signaling channels.

10. A switching apparatus accommodating a subscriber apparatus via one or more physical interface(s) to allocate a plurality of virtual paths to which virtual connections may be set to said physical interface(s) to virtually-handle said physical interface(s) as one single virtual interface, said switching apparatus comprising:

a plural-signaling-channel setting unit for setting a plurality of signaling channels for virtual connection setting control to said virtual interface;

a signaling channel information storing unit for storing signaling channel information on said plural signaling channels;

a virtual interface information storing unit for storing virtual interface information for uniquely identifying a virtual path to which said virtual connection should be set in said virtual interface as information in common to said signaling channel information; and a virtual connection setting control unit for identifying a virtual path that is an object of virtual connection setting on the basis of said virtual interface information when receiving a set request for said virtual connection from said subscriber apparatus over an arbitrary signaling channel accommodated by a physical interface of the switching apparatus, and setting a virtual connection to a virtual path using said signaling channel over which said set request is received, wherein the set virtual path belongs to another physical interface of the switching apparatus that is different from the physical interface having the signal channel used for the set request.

11. The switching apparatus according to claim 10, wherein said virtual interface information storing unit sets different identification information to each virtual connection that may be set in said virtual interface and stores identification information on said physical interface and identification information on said virtual path correspondingly to said identification information; and said virtual connection setting control unit identifying a physical interface and a virtual path to which said virtual connection should be set on the basis of the identification information on said virtual connection required to be set.

12. The switching apparatus according to claim 10 further comprising an attribute information storing unit for storing attribute information relating to a control on said signaling channels;

wherein said virtual connection setting control unit controls a mode of use of said signaling channels on the basis of said attribute information in said attribute information storing unit.

13. The switching apparatus according to claim 12, wherein said attribute information storing unit stores attribute information for using said plural signaling channels as a current channel and a standby channel; and said virtual connection setting control unit uses said current channel in a normal state, while switching a signaling channel in use to said standby channel to use said standby channel in an emergency where a trouble occurs in said current channel and said current channel becomes unusable on the basis of said attribute information.

14. The switching apparatus according to claim 12, wherein said attribute information storing unit sets attribute information for selecting a plurality of arbitrary signaling channels among said plural signaling channels to use them; and said virtual connection setting control unit selects arbitrary plural signaling channels on the basis of said attribute information, and controls setting of different virtual connections over the selected signaling channels.

15. The switching apparatus according to claim 12 further comprising a maintenance terminal for said switching apparatus; and an attribute information altering unit for altering setting of said attribute information in said attribute information storing unit according to an attribute information alter signal from said maintenance terminal.

16. The switching apparatus according to claim 13, wherein said attribute information storing unit stores attribute information about whether a signaling channel in use is switched to said current channel when a trouble occurring in said current channel is recovered and said current channel becomes usable; and said virtual connection setting control unit switches a signal channel in use to said current channel after recovery of said trouble if attribute information signifying that the signaling channel in use is switched is stored in said attribute information storing unit, while not switching the signaling channel in use but continuously using said standby channel if attribute information signifying that the signaling channel in use is not switched is stored in said attribute information storing unit.

17. The switching apparatus according to claim 16 further comprising a maintenance terminal for said switching apparatus; and an attribute information altering unit for altering setting of said attribute information in said attribute information storing unit according to an attribute information alter signal from said maintenance terminal.

18. The switching apparatus according to claim 16, wherein said attribute information storing unit stores attribute information about whether a virtual connection having been set is relieved at the time of said signaling channel switching; and said virtual connection setting control unit continuously controls a virtual connection in communication over a signaling channel after the switching if attribute information signifying that said virtual connection is relieved is stored in said attribute information storing unit, while initializing virtual connection setting control on all virtual paths over said signaling channel after the switching if attribute information signifying that said virtual connection is not relieved is stored in said attribute information storing unit.

19. The switching apparatus according to claim 18 further comprising a maintenance terminal for said switching apparatus; and an attribute information altering unit for altering setting of said attribute information in said attribute information storing unit according to an attribute information alter signal from said maintenance terminal.

20. The switching apparatus according to claim 13, wherein said attribute information storing unit stores attribute information about whether a virtual connection having been set is relieved at the time of said signaling channel switching; and said virtual connection setting unit continuously controls a virtual connection in communication over a signaling channel after the switching if attribute information signifying that said virtual connection is relieved is stored in said attribute information storing unit, while initializing virtual connection setting control on all virtual paths over said signaling channel after the switching if attribute information signifying that said virtual connection is not relieved is stored in said attribute information storing unit.

21. The switching apparatus according to claim 13 further comprising a maintenance terminal for said switching apparatus; and an attribute information altering unit for altering setting of said attribute information in said attribute information storing unit according to an attribute information alter signal from said maintenance terminal.

22. The switching apparatus according to claim 20 further comprising a maintenance terminal for said switching apparatus; and an attribute information altering unit for altering setting of said attribute information in said attribute information storing unit according to an attribute information alter signal from said maintenance terminal.

23. The switching apparatus according to claim 14, wherein said attribute information storing unit stores attribute information about whether a backup control is conducted on a virtual connection having been set when a trouble occurs in a part of said plural signaling channels and a relevant signaling channel becomes unusable; and said virtual connection setting control unit uses a signaling channel other than said part of the signaling channels to control said virtual connection having been set if attribute information signifying that said backup control is conducted is stored in said attribute information storing unit.

24. The switching apparatus according to claim 23 further comprising a maintenance terminal for said switching apparatus; and an attribute information altering unit for altering setting of said attribute information in said attribute information storing unit according to an attribute information alter signal from said maintenance terminal.

25. The switching apparatus according to claim 23, wherein said attribute information storing unit stores attribute information about whether a virtual connection having been set is relieved or not at the time of said backup control; and said virtual connection setting control unit continues a control on a virtual connection in communication over another signaling channel to conduct said backup control if attribute information signifying that said virtual connection is relieved is stored in said attribute information storing unit.

26. The switching apparatus according to claim 25 further comprising a maintenance terminal for said switching apparatus; and an attribute information altering unit for altering setting of said attribute information in said attribute information storing unit according to an attribute information alter signal from said maintenance terminal.

27. The switching apparatus according to claim 14, wherein said virtual connection setting control unit uses a plurality of arbitrary signaling channels to control setting of virtual connections in response to set requests having different call identification information.

28. The switching apparatus according to claim 14 further comprising a maintenance terminal for said switching apparatus; and an attribute information altering unit for altering setting of said attribute information in said attribute information storing unit according to an attribute information alter signal from said maintenance terminal.

29. A switching apparatus connected via one or more physical interface(s) to a subscriber apparatus accommodating subscriber terminals via a plurality of physical lines, said switching apparatus to allocate a plurality of virtual paths to which virtual connections may be set to said physical interface(s) to virtually-handle said physical interface(s) as one single virtual interface, to accept a request for set from said subscriber terminal over a signaling channel accommodated by a physical line and acquiring an information channel accommodated by a physical line in response to said request for set, said switching system characterized by:

a virtual connection setting control unit for identifying a virtual path that is an object of virtual connection setting on the basis of virtual interface information when receiving a request for set for said virtual connection from said subscriber apparatus over an arbitrary signaling channel accommodated by a physical interface of the switching apparatus; and that in response to the request for set, said switching apparatus acquires an information channel accommodated by a physical line that is different from a physical line accommodating a signaling channel over which said request for set is transmitted.

* * * * *